United States Patent
Hess et al.

(10) Patent No.: US 8,693,610 B2
(45) Date of Patent: Apr. 8, 2014

(54) SYSTEM AND METHOD FOR IMPLEMENTING UNIFIED COMPUTER-BASED MANAGEMENT OF FIRE SAFETY-RELATED RISK AND COMPENSATORY MEASURES MANAGEMENT IN NUCLEAR POWER PLANTS

(76) Inventors: Gregory J. Hess, Ashburn, VA (US); Vernon J. Patton, Oregon, OH (US)

( * ) Notice: Subject to any disclaimer, the term of this patent is extended or adjusted under 35 U.S.C. 154(b) by 1163 days.

(21) Appl. No.: 11/802,885

(22) Filed: May 25, 2007

(65) Prior Publication Data

US 2014/0064426 A1   Mar. 6, 2014

Related U.S. Application Data

(60) Provisional application No. 60/808,559, filed on May 26, 2006.

(51) Int. Cl.
*G21C 9/00* (2006.01)

(52) U.S. Cl.
USPC .......................................................... 376/277

(58) Field of Classification Search
None
See application file for complete search history.

(56) References Cited

U.S. PATENT DOCUMENTS

| | | | |
|---|---|---|---|
| 4,232,306 A | 11/1980 | Mizuno | |
| 4,607,256 A | 8/1986 | Henzel | |
| 5,634,039 A | 5/1997 | Simon et al. | |
| 5,664,112 A | 9/1997 | Sturgeon et al. | |
| 5,680,329 A | 10/1997 | Lloyd et al. | |
| 5,808,541 A | 9/1998 | Golden | |
| 5,950,150 A | 9/1999 | Lloyd et al. | |
| 6,169,927 B1 | 1/2001 | Schönthal et al. | |
| 6,421,571 B1 | 7/2002 | Spriggs et al. | |
| 6,549,827 B1 | 4/2003 | Yen | |
| 6,745,200 B2 | 6/2004 | Starkey | |
| 6,775,576 B2 | 8/2004 | Spriggs et al. | |
| 6,980,978 B2 | 12/2005 | Charron et al. | |
| 2008/0016145 A1 * | 1/2008 | Takase et al. | 709/203 |

FOREIGN PATENT DOCUMENTS

WO   WO-2006028067 A1 *   3/2006   ............. G06T 17/50

OTHER PUBLICATIONS

Texas A&M University Hot Work Permit Program, pp. 1-8, Dated Apr. 2005.*
U.S. Nuclear Regulatory Commission (NRC) Regulatory Guide 1.205, Risk-Informed, Performance-Based Fire Protection for Existing Light-Water Nuclear Power Plants, codified at Title 10, Section 50.48(c) of the Code of Federal Regulations.
10 CFR Part 50, Appendix R, entitled "Fire Protection Program for Nuclear Power Facilities Operating Prior to Jan. 1, 1979."

* cited by examiner

*Primary Examiner* — Jack W Keith
*Assistant Examiner* — Marshall O'Connor
(74) *Attorney, Agent, or Firm* — Nixon & Vanderhye P.C.

(57) ABSTRACT

A computer-implemented system and method for managing operations in a nuclear power plant generates an electronic request for a permit to perform work in the plant, performs a risk assessment using a rules engine to determine a level of fire risk posed by the work, automatically determines one or more compensatory measures to provide protection against the level of fire risk posed by work, generates a risk score based the probabilistic assessment, and generates electronic authorization for the permit based on the risk score.

25 Claims, 22 Drawing Sheets

Details for a Barrier Impairment

Davis-Besse Nuclear Power Station

Room 11 > Impairment > Barrier > Wall
Close
Cancel

Printer-friendly page

Component: 011-F/105-C
Word Document Number:
Reason for Impairment
knkjnl
Fire Watch Performed by: security
Level: Minor Impairment
Get Compensatory Measures
Room: 11
Risk Score: 2.0
Compensatory Measures: 8 hour fire watch required. Appendix O barrier failure.
Room: 15
Risk Score: 2.0
Compensatory Measures: 8 hour fire watch required. Appendix O barrier failure.

Status: Approved
Origination: PATTONV
Extension: 7508
Date: 13 Apr 2006 13:58

Barriers
Status:
011-F/015-C   Inoperable

Suppression
Status: Operable

Detection
Status: Operable

TCP
Status: No TCPs

Hot Work
Status: No Hot Work

Triple Tech Inc.

FIG. 12

Details for a Suppression Impairment

Davis-Besse Nuclear Power Station

Room 51 > Impairment > Suppression
Close
Cancel

Printer-friendly page

Component: FSA-051
Will this impairment last more than 48 hours? ☐
Word Document Number: 65464
Reason for Impairment
test Status: Approved
Origination: PATTONV
Extension: 7508
Date: 13 Apr 2006 14:25

Notification Made By:
Date:
Information:

Fire Watch Performed by: security
Get Compensatory Measures
Room: 51
Risk Score: 2.8
Compensatory Measures: 8 hour fire watch required.
Appendix O suppression failure.

Barriers
Status:
051-W/053-E    Inoperable

Suppression
Status:
FSA-051    Inoperable

Detection
Status: Operable

TCP
Status: No TCP's

Hot Work
Status: No Hot Work

▽ Triple Tech Inc.

*FIG. 14*

Details for a Detection Impairment

Davis-Besse Nuclear Power Station

Alarm Panel Node 2 > Impairment Alarm Panel

[ Save ] [ Approve ] [ Override ] [ Close ]
[ Cancel ]

Work Document Number: 535423

Reason for Impairment
test

[ Get Compensatory Measures ]

Room: 50
Risk Score: 3.0
Compensatory Measures:
Continuous fire watch required.
Appendix R barrier failure with
no working detection on both sides
Room: 51
Risk Score: 8.3
Compensatory Measures:
Continuous fire watch required.
Appendix R barrier failure with
detection failure with no
working detection on both sides
with suppression failure.
Room: 52
Compensatory Measures:
Continuous fire watch required.
Appendix R barrier failure with
detection failure with no
working detection on both sides
Room: 53
Compensatory Measures:
Continuous fire watch required.
Appendix R barrier failure with
detection failure with no
working detection on both sides.

Fire Watch Performed by: security

Status: Draft
Origination: PATTONV
Extension: 7508
Date:

▽ Triple Tech Inc.

SYSTEM AND METHOD FOR IMPLEMENTING UNIFIED COMPUTER-BASED MANAGEMENT OF FIRE SAFETY-RELATED RISK AND COMPENSATORY MEASURES MANAGEMENT IN NUCLEAR POWER PLANTS

CROSS-REFERENCE TO RELATED APPLICATIONS

This application claims benefit of U.S. Provisional Application Ser. No. 60/808,559, filed on May 26, 2006, the contents of which are incorporated by reference herein.

FIELD

The present invention relates to safety management systems, and more particularly to managing information for implementing fire safety regulations in nuclear power plants.

BACKGROUND

On Mar. 22, 1975, a fire at the Browns Ferry Nuclear Power Plant fundamentally changed the concept of fire protection and associated regulatory requirements for U.S. nuclear power plants. Plant workers were fixing leaks in the cable spreading room outside the reactor building. The workers used a candle to test seals for air leaks into the reactor building. The polyurethane foam seal, however, was not fire-rated. The flame from the candle ignited both the seal and the electrical cables that passed through it.

By the time the fire was extinguished, it had burned for almost 7 hours. More than 1600 electrical cables were affected, 628 of which were important to plant safety. The fire damaged electrical power, control systems, and instrumentation cables and impaired cooling systems for the reactor. Operators could not monitor the plant normally and had to perform emergency repairs on systems needed to shut the reactor down safely.

Investigations after the fire revealed deficiencies in the design of fire protection features at nuclear power plants and in the plant procedures for responding to a fire. Fire insurance companies, normally concerned with occupant safety and property protection, did not sufficiently consider nuclear safety issues. A fire in certain locations at a nuclear plant could cause redundant safety systems and components to fail, making it difficult to shut the reactor down safely.

After the Browns Ferry fire, the Nuclear Regulatory Commission (NRC) revised its fire protection regulations to reduce the chances of a fire starting and the consequences should a fire occur. Under these regulations, each licensee is required to maintain the ability to shut down the reactor safely in the event of a fire. More specifically, the objectives of the regulations are to: (1) minimize the potential for fires and explosions, (2) rapidly detect, control, and extinguish fires that do occur; and (3) ensure that fire will not prevent operators from shutting down the reactor safely or increase the risk of significant radioactive releases to the environment.

Nuclear power plants have begun to implement redundant methods of fire protection to keep fires from damaging plant safety systems. Some of these methods include fire barriers, fire detection systems, and fire suppression systems (such as sprinklers). If a required element of fire protection is not available, the licensee must compensate for it using 'Compensatory Measures,' which often include placing dedicated personnel on a fire watch. The NRC regularly inspects licensees' means of achieving and maintaining the safe shutdown of their reactors in the event of a fire.

In addition, plant workers are required to obtain permits before performing work that could potentially affect the fire safety posture of a plant or fire area. These permits must be obtained before work is performed on barriers such as walls or doors, suppression systems such as sprinkler systems, detection systems such as smoke detectors, 'Hot Work' such as welding or the use of flame-based heaters, and the movement of Transient Combustibles such as fuel, paint or large amounts of flammable clothing.

Existing techniques for complying with NRC fire protection requirements have a number of drawbacks. Perhaps most importantly, these techniques are mostly manually performed and paper-based. For example, work permits are created on paper and tracked in filing cabinets. Compensatory measures are calculated by hand, which proves to be tedious and prone to error.

Some efforts have been made to improve fire risk management in nuclear power plants. These efforts involve the use of a database to track work permits. However, these databases are passive in nature, serving merely to store and output data. They are not equipped, for example, to perform rules-based decision-making, probabilistic risk assessments, compensatory measures calculations, or any other type of complex processing. Thus, even with these databases, the need for human intervention to review and approve the substance of the permits in view of prevailing NRC safety rules is significant.

A need therefore exists for a system and method of providing information for managing risk in a power plant in a way that will ensure compliance with NRC and/or other fire safety requirements, which system and method may automatically be performed by a integrated rules-based processing engine that requires virtually no human intervention, that significantly reduces the time, cost, and efficiency of managing the plant, and which provides a more reliable safeguard against fire hazards.

SUMMARY OF THE INVENTION

One objective of the present invention is to provide a system and method of providing information for managing risk in a power plant or other industrial facility.

Another objective of the present invention is to implement the aforementioned system and method to inform or guide personnel in managing fire risks and other safety hazards in a nuclear power plant.

Another objective of the present invention is to use an application program that takes a holistic approach to providing information for informing and guiding personnel in managing fire risks that may arise from certain work or activities to be performed in a nuclear power plant.

Another objective of the present invention is to provide information of the aforementioned type which may be used by a fire marshal or plant control room personnel to make decisions including, for example, whether to approve work permits with or without the implementation of compensatory measures.

Another objective of the present invention is to monitor, in real-time, the fire safety status of a nuclear power plant or other facility and to update the status when work that poses a risk is sought to be performed.

Another objective of the present invention is to use a rules-based decision engine to perform a probabilistic risk assessment (PRA) analysis of permits for work that pose a fire risk in one or more areas of a nuclear power plant, which analysis may use PRA numbers to support an actual core damage frequency analysis in real time for the plant Another objective of one non-limiting embodiment of the present invention is to store impairments, hot work, transient combustible permit, and other safety-related information in a single database, which allows for holistic use of the information for performing a risk determination analysis and generating reports such as but not limited to NRC reports and trend analysis.

Another objective of the present invention is to automatically calculate one or more compensatory measures to be used during the work described in a permit, which compensatory measures are calculated based on results of a probabilistic risk assessment analysis and which are intended to serve as a protection or safeguard against fire that may occur during the work period.

Another objective of the present invention is to implement a rules-based processing architecture which uses integrated work permit processing to thereby offer a holistic approach to compensatory measures calculations.

Another objective of the present invention is to provide a system and method which integrate permits processing for barrier impairments, suppression impairments, detection impairments, hot work, and transfer of combustible materials in a nuclear power plant, which system and method is preferably implemented using a single computer program which provides the ability to centrally control all aspects of an operational fire safety program.

Another objective of the present invention is to provide a process for automatically generating and entering permits for work to be performed in a nuclear power plant, which process is implemented using a standard format which may be modified to meet the specific features of different power plants.

These and other objectives and advantages of the present invention are achieved by providing a computed-implemented method of providing information for managing risk in a nuclear power plant, which method includes receiving an electronic request for a permit to perform work in a plant area, obtaining a first risk value corresponding the work identified in the permit; obtaining a second risk value relating to the work area identified in the permit; performing an assessment analysis using a rules engine to determine a level of fire risk posed by the work, the assessment analysis performed based on the first and second risk values; generating a risk score based a result of the assessment analysis; and generating electronic authorization for the permit based on the risk score.

The present invention also provides a system for providing information for managing risk in a nuclear power plant. This system includes a terminal to enter information for generating an electronic request for a permit to perform work in the plant; a rules engine which performs a risk assessment analysis to determine a level of fire risk posed by the work, and to automatically determine one or more compensatory measures to provide protection against the level of fire risk; and a central processor to generate a risk score based the probabilistic assessment, and to generate electronic authorization for the permit based on the risk score.

The system may also include a memory to store a set of rules defining a fire safety policy for the nuclear power plant, wherein the rules engine performs said probabilistic assessment by comparing the work requested in the permit to the set of rules, and wherein the risk score is generated based on said comparison. A more detailed description of the system and method of the present invention now follows.

BRIEF DESCRIPTION OF THE DRAWINGS

FIG. 12 is a diagram showing a screen that may be generated when one of the barrier impairments listed on the screen of FIG. 11 is selected.

FIG. 14 is a diagram showing a screen that may be generated when one of the suppression impairments listed on the screen of FIG. 13 is selected.

FIG. 16 is a diagram showing a screen that may be generated when one of the detection impairments listed on the screen of FIG. 15 is selected.

FIG. 18 shows a screen that may be generated to obtain a Hot Work permit in the plant.

DETAILED DESCRIPTION

Fire protection rules and regulations promulgated by the NRC provide safety margins for nuclear power plants, by ensuring that systems needed to safely shut down the reactor will survive a fire. Early versions of these requirements were deterministic in nature (e.g., based on a bounding set of possible accidents) and did not take probabilistic risk assessments (PRAs) into consideration. Past rules and regulations also did not consider recent advances in performance-based methods such as fire modeling.

The present invention represents a significant improvement in the art, in that it provides a system and method of providing information for managing risk in an industrial facility, e.g., a nuclear power plant. In accordance with one embodiment, the system and method uses a processing architecture that integrates and analyzes risk information, automatically computes compensatory measures, performs fire safety modeling, and implements a variety of rules-based decisions to ensure compliance with risk-informed and performance-based regulations relating to fire safety in the plant.

Risk-informed regulations ensure that the safety significance of requirements is considered and that the burden of a requirement on licensees is appropriate to the safety level that it provides. Performance-based regulations rely on a required outcome rather than a prescriptive process or technique. By ensuring compliance with these regulations, rules compliance can be ensured of being performed faster, more efficiently, and more effectively compared with prior methods.

System Overview

In accordance with one embodiment, the system and method of the present invention continuously monitors, in real-time, the overall fire-safety status of a nuclear power plant. This is accomplished by taking into consideration the current status of each zone of the plant, as well as all or a predetermined number of plant security systems which include but are not limited to fire barriers, fire detection systems, and fire suppression systems. The system also takes into consideration compensatory measures that may have been or may required to be put into place, for example, as a result of a particular type of work to be performed in a specific area in the plant.

Figure 1:
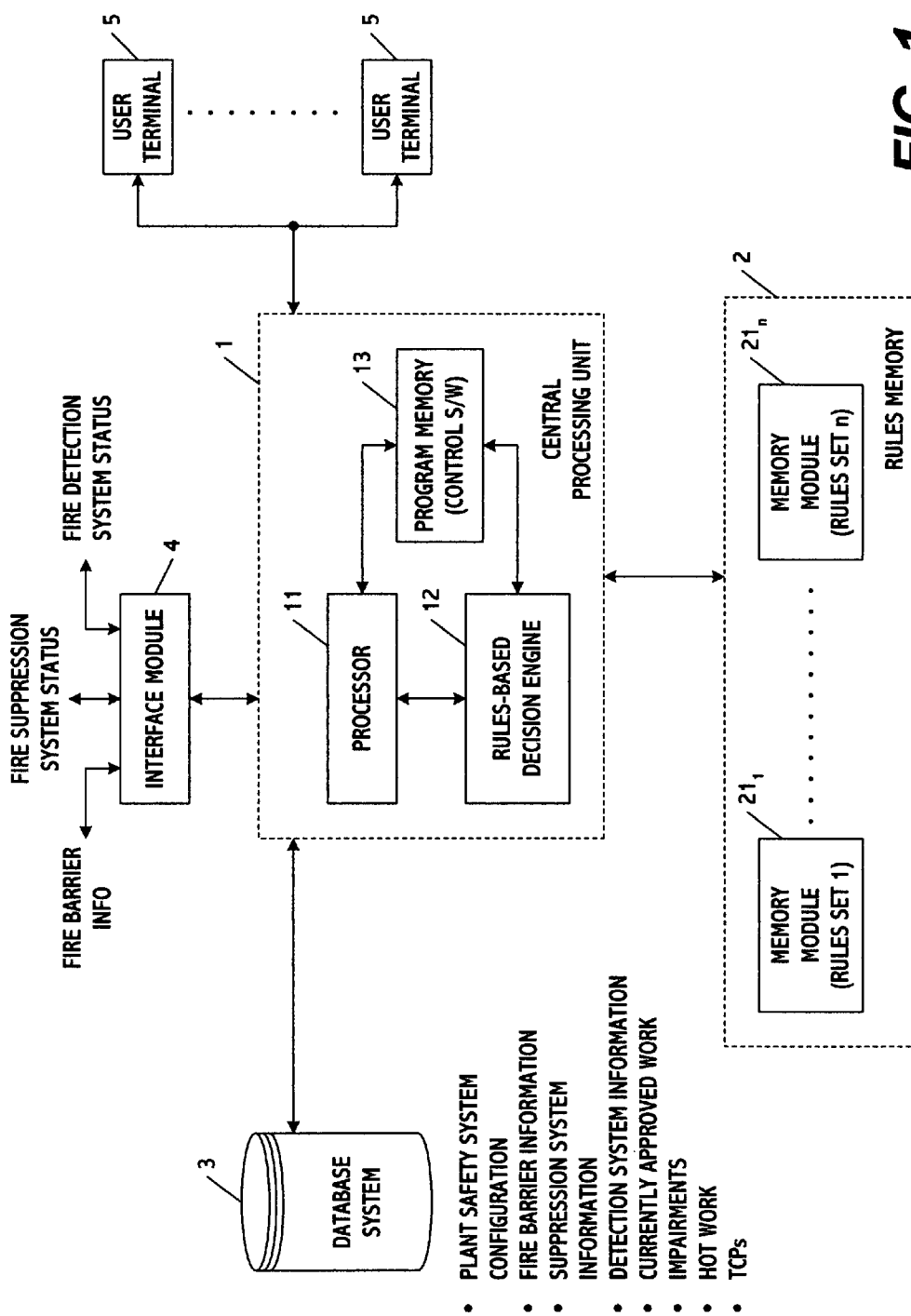
FIG. 1 is a diagram showing a system for managing operations in a nuclear power plant according to one embodiment of the present invention.

FIG. 1 shows one way in which the system of the present invention may be configured from a hardware standpoint. In this embodiment, the system includes a central processing unit 1, a rules memory 2, a database system 3, an interface module 4, and a plurality of user terminals 5. The system may be located on-site at a predetermined location in the plant, or any of the components of the system may be remotely located from the plant, for example, at a central authority site. In the latter case, the different components of the system may be coupled by local or wide area networks, e.g., the Internet.

The central processing unit 1 includes a processor 11, a rules-based decision engine 12, and a program memory 13 for storing control and management software. The processor executes the control and management software to perform the functions of the various embodiments of the invention. These functions include continuously monitoring the fire safety status of the plant, in real-time, based on information stored in its databases, received from sensor signals of plant detection systems, as well as other information and data to be described in greater detail below.

In performing these management functions, the processor also interacts with the rules-based decision engine to generate a risk score and/or risk color for indicating the safety risk(s) in performing work in one or more areas of the plant and/or to provide an indication of the overall fire safety status of the plant. The rule-based decision engine may also compute compensatory measures, as needed, to ensure compliance with safety regulations of the NRC and/or those of another private or governmental agency.

To ensure compliance, rules engine 12 interacts with memory modules $21_1$ to $21_n$ in the rules memory. Each module stores information on respective numbers of sets of rules, regulations, and standards for ensuring safe operation of the plant. Examples include those set forth in the following documents: (1) General Design Criterion 3, Fire Protection of Appendix A, "General Design Criteria for Nuclear Power Plants," to "Domestic Licensing of Production and Utilization Facilities," now codified at 10 CFR Part 50, (2) "Fire Protection Program for Nuclear Power Facilities Operating Prior to Jan. 1, 1979," codified at 10 CFR Part 50, Appendix R, taking the exceptions set forth in 10 CFR 50.48(b) into consideration, (3) National Fire Protection Association (NFPA) Standard 805, "Performance-Based Standard for Fire Protection for Light Water Reactor Electric Generating Plants," (4) Nuclear Energy Institute guidance document [NEI 04-02] entitled "Guidance for Implementing a Risk-Informed, Performance-Based Fire Protection Program under 10 CFR 50.48(c)," available in ADAMS, ML051430573, (5) U.S. Nuclear Regulatory Commission (NRC) Regulatory Guide 1.205, "Risk-Informed, Performance-Based Fire Protection for Existing Light-Water Nuclear Power Plants, codified at Title 10, Section 50.48(c) of the Code of Federal Regulations, and/or (6) Appendix O, which is a term used to refer to other regulations including standard building codes for the community or state wherein the plant is located, and which therefore may represent the minimum set of rules that apply to fire safety for the plant. The contents of these documents and any supplement thereto are incorporated by reference herein.

In order to implement the aforementioned regulations, the system and method of the present invention performs risk-based calculations for a wide variety of scenarios that might come up in operational practice. These calculations may be performed based on probabilistic risk assessments or default parameters pre-assigned to the work and the area in which the work is to be performed. The calculations are then relied on to compute a risk score indicative of the safety status of the overall plant and/or of a particular are of the plant.

When work must be performed in a given area, or other situations arise that may alter current safety status, the system and method may modify the risk score or color accordingly. For example, for each fire area in a nuclear facility, the change in fire risk may be calculated if a suppression system, detection system, or barrier fails. The system and method may also calculate the affect of various levels of transient combustibles and the impact of various kinds of "Hot Work." These complex calculations are then integrated mathematically by the rules-based engine to generate a revised risk score, which may be used to determine the level of risk mitigation required for the given scenario, e.g., work to be performed.

The database system 3 may be a single database or a distributed network of databases, each dedicated to storing specific information on various aspects of the system. For example, the database system may store information identifying the different areas of each plant and the operations and particular performance requirements of each area. The database system may also store information identifying safety systems (including fire barriers, fire suppression systems, and detection systems) that are in place in each area of the plant. Additional information which may be stored include the existence of any impairments in the plant facility, currently approved work, a history of previous work, and scheduling conflicts that may exist for work projects planned in a common area. All of this information may be taken into consideration by the rules-based decision engine in monitoring fire safety status of the plant, computing compensatory measures, and probabilistic risk assessments (e.g., score/color) and fire safety modeling throughout the plant.

Interface module 4 may receive information (e.g., wirelessly or through a network) from various areas or systems of the plant for storage in the database system. This information may also be used by the central processing unit in monitoring fire safety status and performing risk assessment. Communications between the central processing unit and, for example, the fire suppression and detection systems may be bidirectional, e.g., in addition to assessing risk the central processing unit (e.g., through the execution of control software by processor 13) may activate, deactivate, or otherwise alter operational features of the fire suppression and detection system in order to achieve optimal compliance with NRC regulations.

The user terminals may be interspersed at predetermined locations throughout the plant facility, to allow convenient access by various authorized personnel. The terminals are coupled to the central processing unit by a network and are preferably interactive to allow real-time access to system information and reporting of unsafe plant conditions. In addition, the terminals may be used to automatically generate requests for permits for specific work in the plant, for example, through the use of a standardized set of forms which may be customized to each work request and/or for the particular requirements of each nuclear power plant.

The terminals may also be used to determine the probable affect of changes in fire safety for proposed work projects, to receive automatically generated compensatory measures calculated by the rules-based decision engine, to assess the affect of a user-desired compensatory measures in terms of risk assessment, to perform various administrative and data entry functions, as well as to achieve other purposes as described in greater detail below.

System Software

In addition to the foregoing features, the system management and control software may provide impairment, Hot Work, and Transient Combustible Permit (TCP) tracking. This approach improves the current state of the art by centralizing the approval process for obtaining permits into a single software program that can be accessed anywhere in the facility. Also, since the computer program is always aware of the fire safety status of the entire plant, workers would no longer need to spend time researching other work being performed in related areas before starting work or getting permits approved.

To facilitate the use of these automated permits, the system software first creates standardized permits based on regulatory requirements, and/or the requirements of the nuclear insurance industry for reporting of fire safety relevant incidents. This capability represents a significant improvement, since the administrators of each plant have traditionally been required to design their own forms with information each thinks is most relevant.

The approach taken by the management software of the present invention standardizes the forms used for obtaining work permits. In addition, to provide maximum flexibility across the user base, the forms are customizable in a way that allows the form labels on the screen to change from one plant to another without changing the overall functionality of the software. In accordance with one embodiment, this flexibility may be attained by keeping field labels in a data file separate from the code of the program. This enables different plants to name a given field with different names, while still using the same program code. This feature may also allow the software to be offered in languages other than English without modifying the functionality of the software.

In addition, because the software is aware of all fire safety-related work being performed within the plant, the software is able to determine compensatory measures automatically, more quickly, and more accurately than the current manual processes. The use of a rules engine allows natural language rules to be used to customize the software for each nuclear facility without modifications to the underlying software code. These rules, for example, direct the system software to process each permit and determine the impact on overall plant fire safety. The software then displays this information in several ways.

First, compensatory measures are calculated and displayed for the permit requestor, and then are placed within the permit itself for historical record. Then, a risk calculation is performed to determine the impact on risk for all plant fire areas for each permit or permit change. This risk calculation may be used to impact (e.g., change, modify, generate, or approve) the compensatory measures if this plant is using risk-informed fire safety management. Otherwise, the risk calculation is used to calculate an overall risk score or 'risk color' as defined by the Nuclear Regulatory Commission (NRC). The risk score/color is preferably displayed on a main screen of the program to inform software users of the current risk posture of the plant at any given time. In addition, changes in risk color can impact displays within the software, such as the level of human review requirement before commencement of work.

The permit submission and approval process as implemented by the present invention will now be described. In accordance with one embodiment, the management and control software is implemented as a 'semi-custom' software implementation. According to this implementation, the software utilizes a large amount of information that is specific to each plant. This information includes information about the rooms, barriers, suppression systems, and detection systems in the plant. In addition, the software takes into consideration unique compensatory measures rules and unique risk calculations that are specific to each plant and each fire area in the plant. Information on the unique compensatory measures rules and risk calculations may be stored in database system 3, one or more memory modules 21, or another data storage unit which may or may not be internal to the central process unit.

To allow the software to take these unique features into consideration without requiring a re-write of the software for each implementation, the software implements rules engine 12. The rules engine may incorporate natural language rules as a data input to the program. These rules describe the compensatory measures, rules for calculation of risk in each fire area, and the risk score or color to be applied to each risk result, as well as a variety of other features.

In addition, infrastructure information on rooms and fire safety systems may be stored in a relational database (within or coupled to database system 3) in a manner that is accessible by the rules engine. Through the use of this semi-custom approach, administrative users of the software are able to describe the plant features and rules to the software in a way that allows the software to properly calculate fire safety status for the plant.

When a permit is created in the system, the software calculates the compensatory measures and a risk score based on, for example, the probability of risks imposed by the nature of the work to be performed, the area of the plant in which the work is to be done, and the potential damage that could result in that area should a fire break out during work. The compensatory measures and risk score may then be used by the software to generate, based on rules, prior experiences, and other objective data programmed into the rules engine, an optimal set of fire safety protections and work guidelines that should be put into place as a safeguard against a fire during a time when the work is performed.

As previously indicated, each work project to be performed has the potential of changing the safety status or risk score (or color) of the plant. Through the rules engine, the system may approve or deny a work permit based on this change.

Minor Risk.

If the change in risk posture of the plant is considered minor (e.g., under a predetermined score or risk tolerance reference), the software may automatically approve the work described in the permit and advise appropriate personnel of one or more compensatory measures considered optimal in guarding against the increased risk.

The work to be performed in any particular area may affect operations or safety conditions in other areas. The present invention may take this into consideration by opting to perform a dynamic analysis, instead of a static analysis which only takes into consideration the risks imposed by work in the permit area. By performing a dynamic analysis, the system software may therefore, through the rules engine, update the risk in other areas of the plant which may be affected by work in the area identified in the permit. Further, the system software may update the overall plant risk for other users of the software, and the user may be allowed to print a copy of the approval or evidence if needed.

Moderate Risk.

If the work requested in the permit would have a moderate impact on the risk posture of the plant, the system software may direct a system administrator to have a shift supervisor or other appropriate person approve the permit before work is performed on continues. The system may also provide recommendations of compensatory measures that should be put into place during the work. These measures may be computed by the rules engine in view of the nature of the work to be performed, the type of compensatory measures that are available (for example, as indicated by information stored in the database system), and the specific types of rules to be satisfied as indicated in the one or more memory modules of the system memory. Once approval (on-line) is provided, the permit is accepted and work can commence.

Serious Risk.

If the work requested in the permit would create a significant degradation of the risk posture, then the system, through the rules engine, may automatically reject the permit. The rejection of the permit may be overridden only if authorization is obtained by specific personnel (e.g., fire safety personnel, fire marshal, high-ranking employees of the plant, etc.), who are given special rights within the system. If the permit rejection is overridden, the system may modify the fire safety risk status of the plant to 'red' risk status during the time when the work is being performed. A red risk status may also trigger the system to generate a visual cue on a main screen of the application for all users of the software.

This holistic view of all related permits in the plant allows the system and method of the present invention to make automated assessments of fire safety that otherwise could not be performed by existing techniques. In addition, the use of PRA calculations to provide real-time risk assessments provides an automated solution to the need for complex risk assessments to support the new risk-informed safety rules. In other embodiments, PRA calculations are replaced by the use of default calculation parameters.

The risk assessments performed by the present invention may also be carried out using a research-based analysis. For example, potential risks developed through computer models or an historical database of actual accidents may be programmed into the rules engine, to allow the engine to make a more informed decision as to what types of work in a plant facility may pose the greatest risk of danger. A risk-informed, research-based system may also provide the potential to improve overall plant safety, while reducing the cost of implementing wrong or on potentially unnecessary compensatory measures.

To achieve the aforementioned level of performance, the management and control software may use 'plug in' calculations and PRA-based or default-based parameters for each fire area in the plant and each piece of fire safety related infrastructure. By providing an architectural approach that provides for the easy customization of PRA-based calculation of risk, the software is able to calculate in real-time what changes in risk are produced from the work described in a given permit. This risk calculation may then enable the calculation of compensatory measures based on the need for risk reduction, rather than through the use of the current prescriptive methodology. The risk results may also be reported back to the rules engine that calculates the risk score or color of each fire area and for the plant as a whole.

Figure 2:
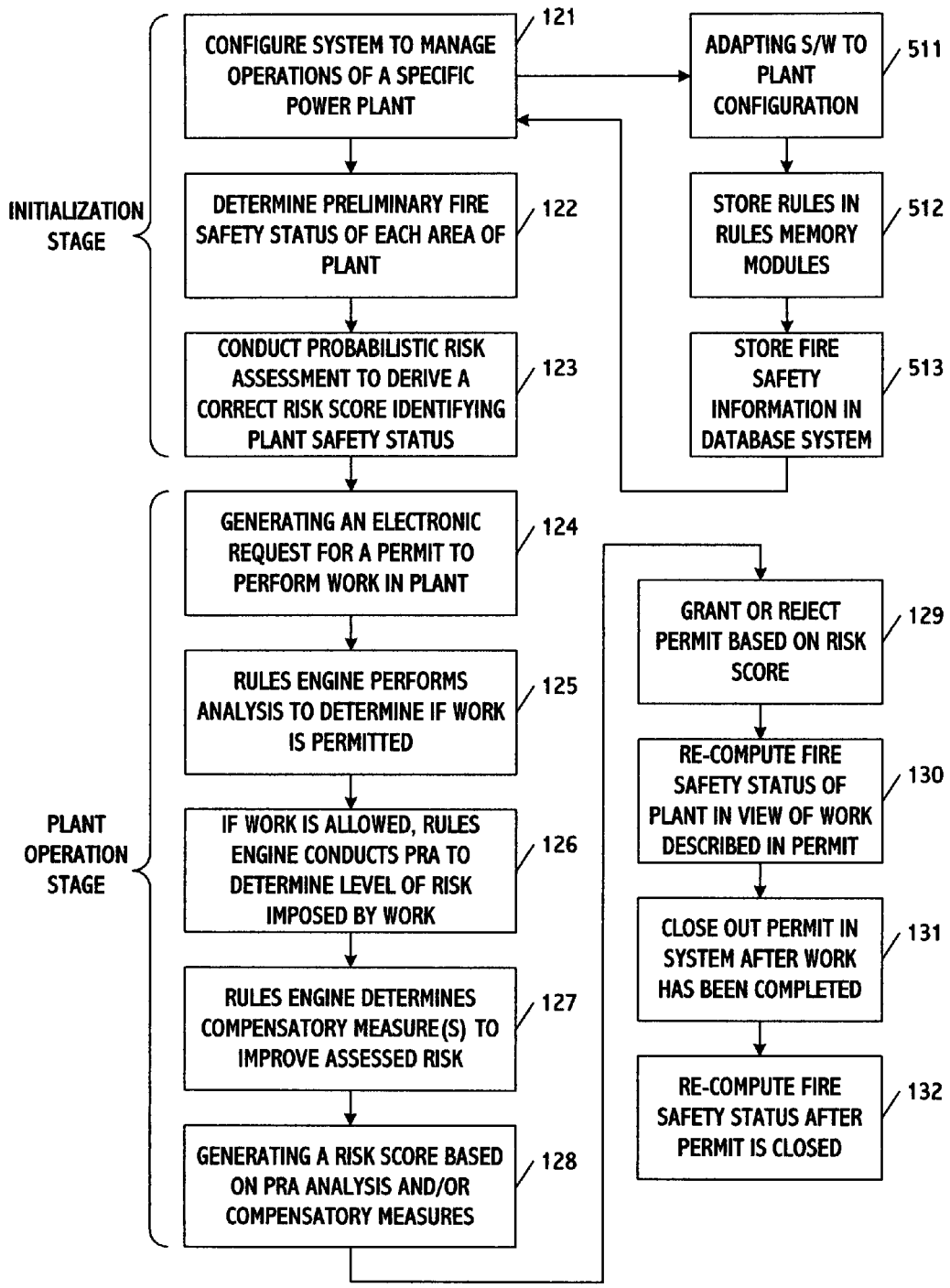
FIG. 2 is a diagram showing steps included in a method for managing operations in a nuclear power plant according to one embodiment of the present invention.

FIG. 2 shows steps included in method for managing operations in a nuclear power plant to ensure compliance with fire safety requirements. The method initially includes configuring the system shown in FIG. 1 to manage operations of a specific power plant. (Block 121). While each power plant tends to have the same basic features, each may also be very different in terms of its layout and the fire safety requirements that are to be implemented throughout each area of the layout.

Accordingly, the configuration step may first include adapting the management and control software of the system (e.g., as stored in memory 13) to the plant configuration. (Block 511). The specific rules and regulations that are to be observed in operating the plant are then stored into one or more memory modules 21 of the rules memory. (Block 512). These rules and regulations include those promulgated by the NRC and also preferably those set by the nuclear insurance industry. The database system is then filled with information identifying the fire safety systems and features located in each area of the plant. (Block 513). These include the overall plant safety system configuration, fire barrier information, fire suppression system information, detection system information and impairments as well as other information.

Once the system has been properly configured, the fire safety status of each area of the plant is preliminarily determined. (Block 122). This involves determining the operations currently being performed in each plant area, including the work that is currently underway in each area, the threat to fire safety imposed by the work, and any compensatory measures that have been put into place to safeguard the areas in which they work is performed against fire damage.

Through its rules engine, a probabilistic risk assessment is then performed by comparing existing conditions to the rules and regulations in the rules memory and/or historical or statistical risk information stored in the database. The result of this analysis is used to compute a risk score (or color) for the entire plant. (Block 123).

Once the system has been initialized according to the aforementioned steps, work permits are ready to be generated, reviewed, and acted on. This includes generating and entering an electronic request for a permit to perform work in a certain area of the plant. (Block 124). The request may be generated by a worker or administrator filling out an electronic form on one of the user terminals. In filling out this form, the area in which the work is to be performed and the type of work to be performed is identified, as well as other information considered pertinent to allowing the system to assess the fire safety risks associated with the work.

Upon receiving the electronic request, the rules engine performs an analysis to determine whether the type of work requested in allowed to be performed within the designated area. (Block 125). This analysis may include checking the work against the rules and regulations stored in the rules memory for compliance.

If the work falls within the scope of work allowed by the rules and regulations in the rules memory, then the rules engine performs a probabilistic assessment of the level of risk associated with the work, not only in the immediate area of the plant in which the work is to be performed but also in other areas that may be affected by a fire in the work area. The probabilistic assessment may be based on the use of PRA values obtained from another source (e.g., the NRC) or default risk values. (Block 126).

The rules engine then performs an analysis to determine whether compensatory measures are available to improve the assessed risk. (Block 127). The compensatory measures are automatically determined by the rules engine, for example, based on a variety of measures previously programmed into the system. Preferably, the rules engine may generate and display on the user terminal one or more optimal compensatory measures that are to be implemented during a time when the work is to be performed. The user may then be given an option by the system to select the compensatory measure(s) prior to granting of the permit.

The risk assessment analysis is then used as a basis for generating a risk score (or color) indicative of the impact the work identified in the permit would have on the fire safety status of the plant. (Block 128). The risk score may be generated by taking the compensatory measures into consideration, or the score may be based only on the risk assessment analysis.

The rules engine, then, makes a determination of whether to grant or reject the work permit based on the risk score. (Block 129). This may involve comparing the risk score to one or more predetermined score ranges that, for example, correspond to minor, moderate, and serious risks. Work permits that pose only a minor risk to fire safety may automatically be granted, while work permits that pose a serious risk may automatically be rejected. For work permits that pose a moderate risk, system software may direct a system administrator to have a shift supervisor or other appropriate person approve the permit before work is performed.

A different set of rules for rejecting or granting work permits may be applied if desired. For example, the method of the present invention may be modified to grant work permits for serious risks, provided additional conditions are met or extraordinary compensatory measures are implemented. These additional conditions may involve whether the work is considered routine or not.

Upon granting the permit, the rules engine may re-compute the fire safety status of the entire plant during the time the work described in the permit is being performed. (Block 130). For example, if the work poses a minor risk in a non-critical area of the plant, the fire safety status of the plant may be left unchanged. Conversely, if the risk posed by the work is serious and is scheduled to be performed in a critical area, the fire safety status of the plant may be revised to correspond to the severity of the risk score calculated for the work described in the permit.

Once the work has been completed, the system is updated with information indicating the same. (Block 131). The central processing unit then re-computes the fire safety status (or color) of the plant in this post-work period. (Block 132). Thus, for example, the re-computed risk score may be indicative of a safer status of the plant in view of completion of the work.

Examples of how the method of the present invention may be applied to specific types of work permits will now be given.

Work Permit for a Fire Barrier

Figure 3:
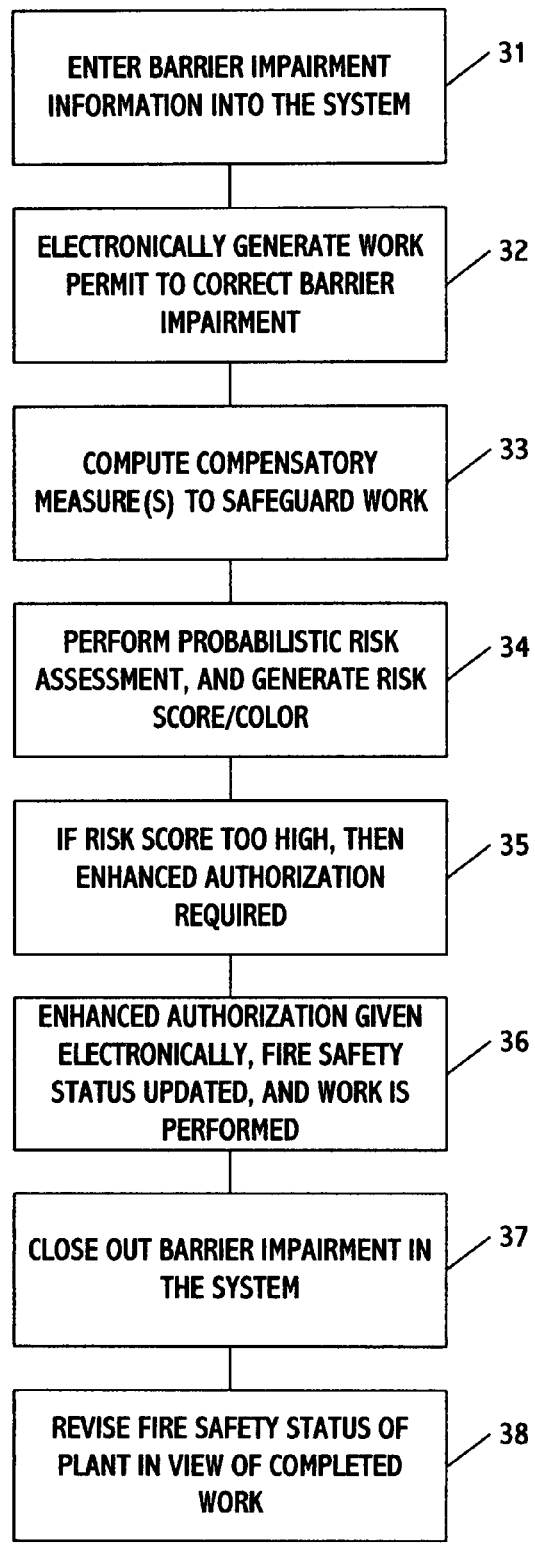
FIG. 3 is a diagram showing steps included in an illustrative method of managing a permit for work to be performed on a fire barrier in the plant.

Referring to FIG. 3, when requesting work to be performed on a fire barrier (e.g., door, wall, fire curtain, penetration seal, or fire damper), the following steps may be performed. First, barrier impairment information is entered into the system, so that the system has knowledge of characteristics relating to the barrier. (Block 31). A work permit is then electronically generated and entered (Block 32), and the system computes compensatory measures, if any, that may be used to safeguard work on the barrier. (Block 33). A risk assessment is then performed to determine the level of risk imposed by the work, taking the computed compensatory measures into consideration. (Block 34). The order of the last two steps may be switched if desired.

If the impairment would leave the plant in a yellow or red risk status (indicative of, for example, a moderate risk or serious risk, respectively) and the risk is routine maintenance, the system may require a special approval of the work permit, e.g., the work permit must be approved by the fire marshal. (Block 35). Approval of this type may be given electronically, for example, by the fire marshal entering his userID and password into the system and then making an appropriate designation. The fire safety status of the plant may then be updated to reflect the risk imposed by the permit, and the work is then performed. (Block 36).

Once the work has been performed, the barrier impairment may be closed out electronically in the system. (Block 37). This may be performed by having work personnel, an administrator, or a supervisor enter his or her userID and password into the system and then entering appropriate information to inform the decision that the work has now been completed. At this point, the central processing unit modifies the fire risk safety status of the plant, or work area, by re-calculating the risk score or color, e.g., the fire safety status of the plant may now be revised to green status. (Block 38). An analogous set of steps may be performed for work to be performed for servicing a detector or alarm panel.

Work Permit for Fixing a Defective Suppression System

Figure 4:
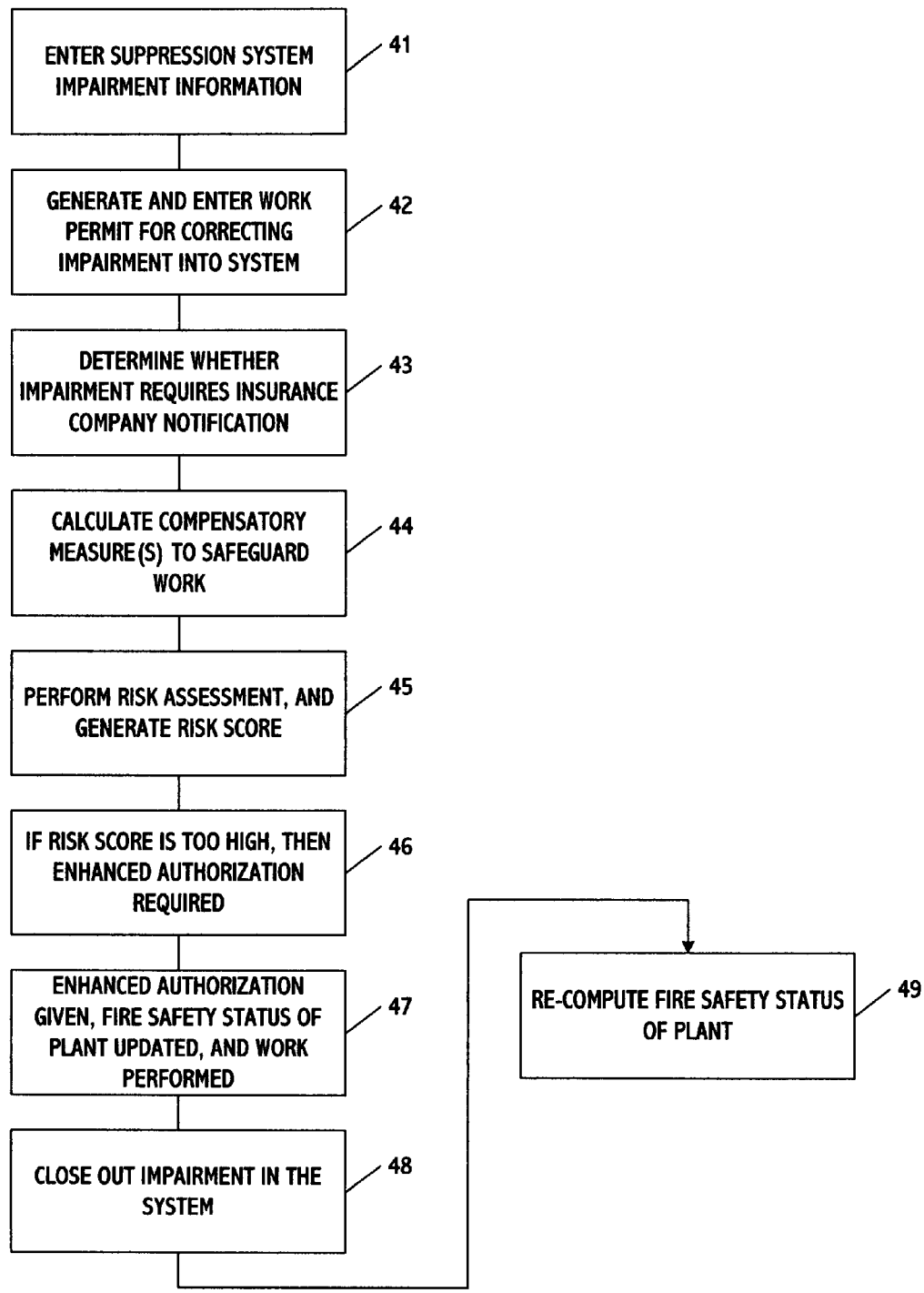
FIG. 4 is a diagram showing steps included in an illustrative method of managing a permit for fixing a defective fire suppression system in the plant.

Referring to FIG. 4, when requesting work to be performed to fix a defective fire suppression system (e.g., sprinkler, hydrant, halon, $CO_2$, foam), the following steps may be performed. First, impairment information indicative of the defect is entered into the system. (Block 41). This may be performed electronically, for example, by a sensor detecting a malfunction and sending an alarm signal to the central processing unit through the interface module 4. Or, the defect may be spotted by a maintenance worker, who then enters an electronic record into the system indicative of the defect.

Next, a work permit for correcting the defect is generated and entered into the system (Block 42), and the management and control software determines whether the impairment (defect) of the fire suppression system meets the criteria for insurance company notification. (Block 43). These criteria may be stored in a respective one of the memory modules 21, and the determination may be made by the rules engine operating based on the management and control software.

Compensatory measures for safeguarding the work are then calculated (Block 44), and a risk assessment is performed to determine the level of risk imposed by the work, taking the compensatory measures into consideration (Block 45). If the impairment would leave the plant in a yellow or red risk status and the work is routine maintenance, the system may require a special approval of the work permit. (Block 46). Approval of this type may be given electronically, for example, by the fire marshal entering his userID and password into the system and then making an appropriate designation. The work is then performed. (Block 47).

Once the work has been performed, the entry indicative of the suppression system impairment may be closed out in the system. (Block 48). This may be performed by having work personnel, an administrator, or a supervisor enter his or her userID and password into the system and then entering appropriate information to inform the decision that the work has now been completed. The central processing unit, then, modifies the fire risk safety status of the plant, or work area, by re-calculating the risk score or color. (Block 49).

Work Permit for Moving Combustible Materials

Figure 5:
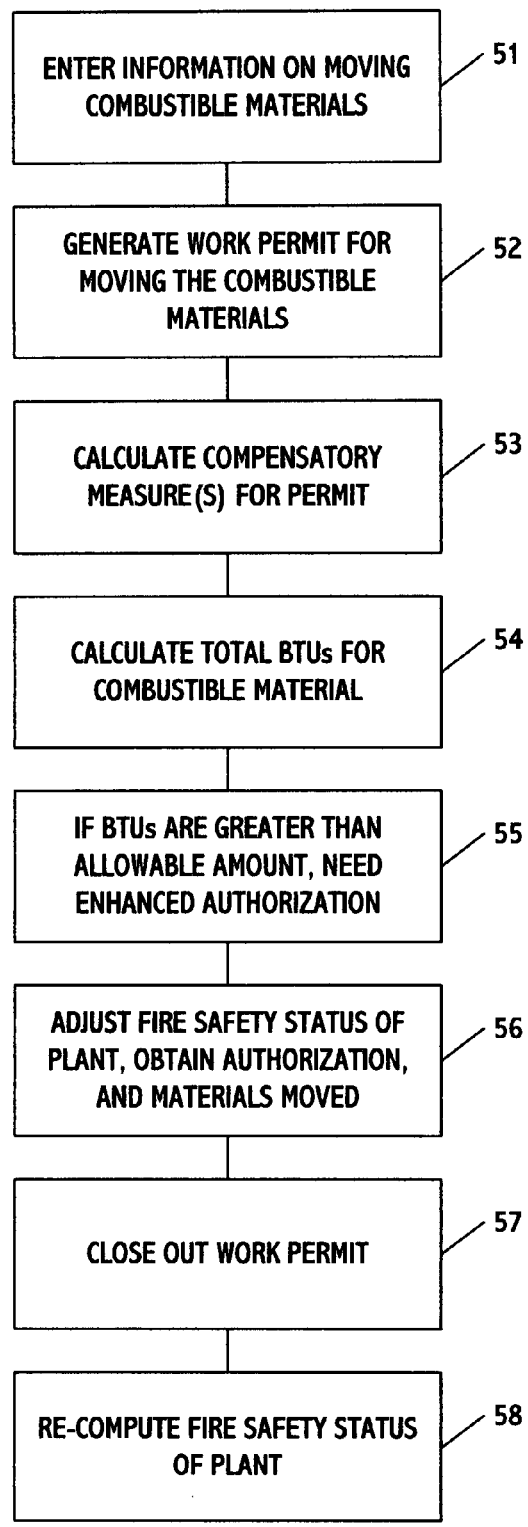
FIG. 5 is a diagram showing steps included in an illustrative method of managing a permit for moving hazardous or combustible materials in the plant.

Referring to FIG. 5, when moving combustible or other hazardous materials, the following steps may be performed. First, impairment information indicative of the request to move the combustible materials is entered into the system. (Block 51). This may be performed, for example, by a user entering an electronic record into the system.

Next, a work permit for moving the materials is entered into the system (Block 52). As in all cases, the work permit may be automatically generated by the system based on information input by the user. The work permit may be in standard form modified to be compatible with the particular requirements of the nuclear power plant.

Once the work permit has been submitted, compensatory measures for safeguarding the move are then calculated. (Block 53). These measures may require the movers to have special fire-extinguishing equipment on hand, or the moving equipment may be required to be padded with fire-retardant material. Next, an assessment is performed to determine the level of risk imposed by the work, taking the compensatory measures into consideration The risk assessment may involve calculating the total BTUs associated with the combustible material. (Block 54). If the number of BTUs exceeds an allowable amount, a yellow or red status may be indicated. In this case, further compensatory measures may be required or the work permit may have to be approved by a high-ranking official, e.g., the fire marshal. (Block 55). The work permit is then approved, and the fire safety status of the plant is revised during a time when the materials are moved. (Block 56).

Once the work has been performed, a record corresponding to the work permit is closed out in the system. (Block 57) and the central processing unit, then, modifies the fire risk safety status of the plant, or work area, by re-calculating the risk score or color (Block 58).

Work Permit for Hot Work

Figure 6:
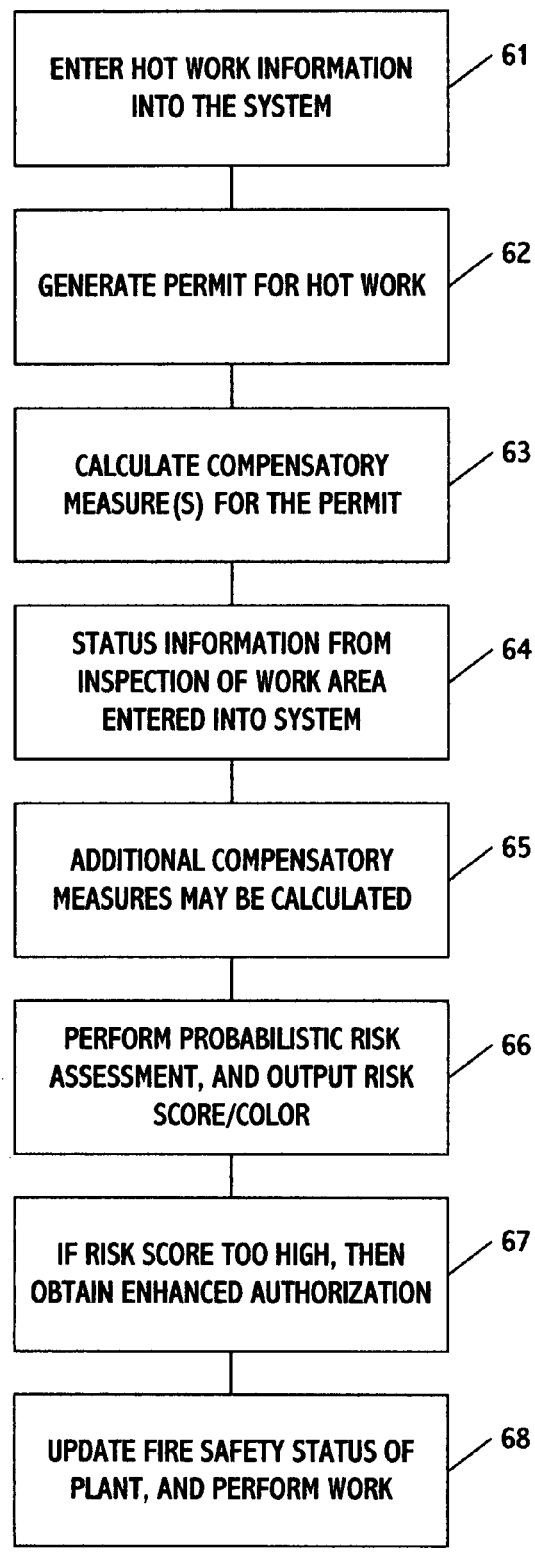
FIG. 6 is a diagram showing steps included in an illustrative method of managing a permit to perform hot work in the plant.
Figure 7A:
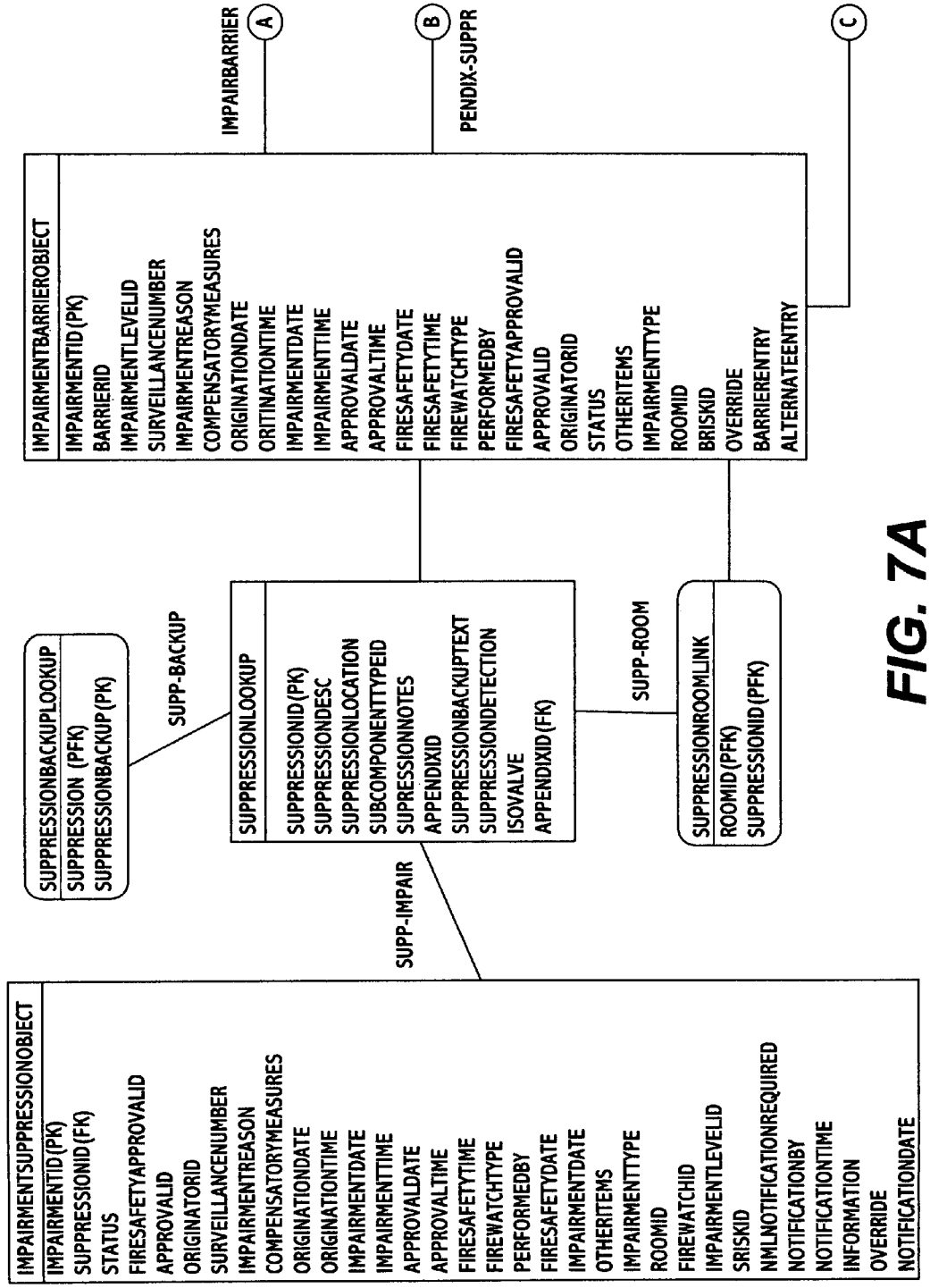
FIGS. 7A-7E are diagrams showing an interrelationship of information may be stored and relied on for purposes of managing operations in a nuclear power plant.
Figure 7B:
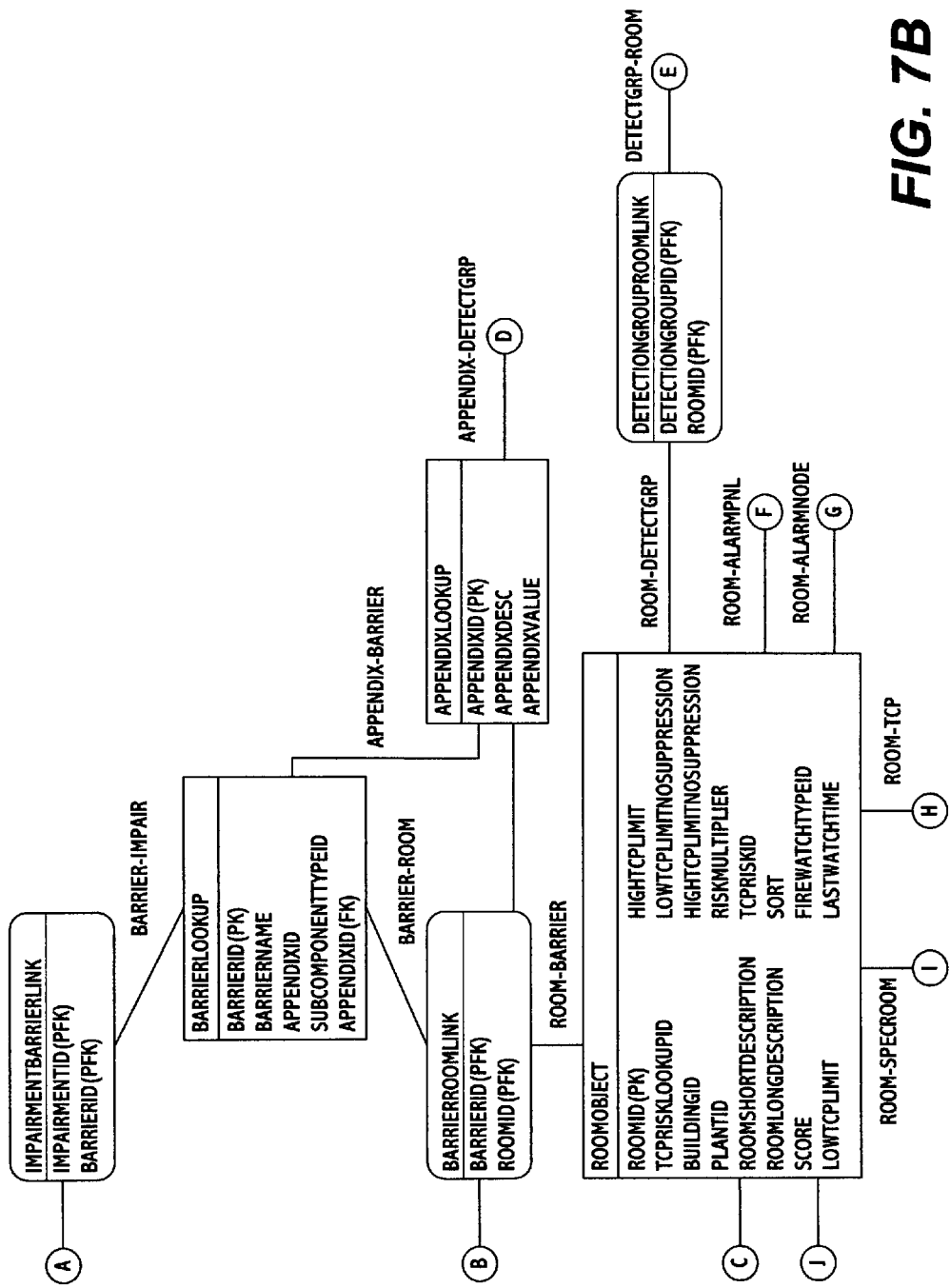
Figure 7C:
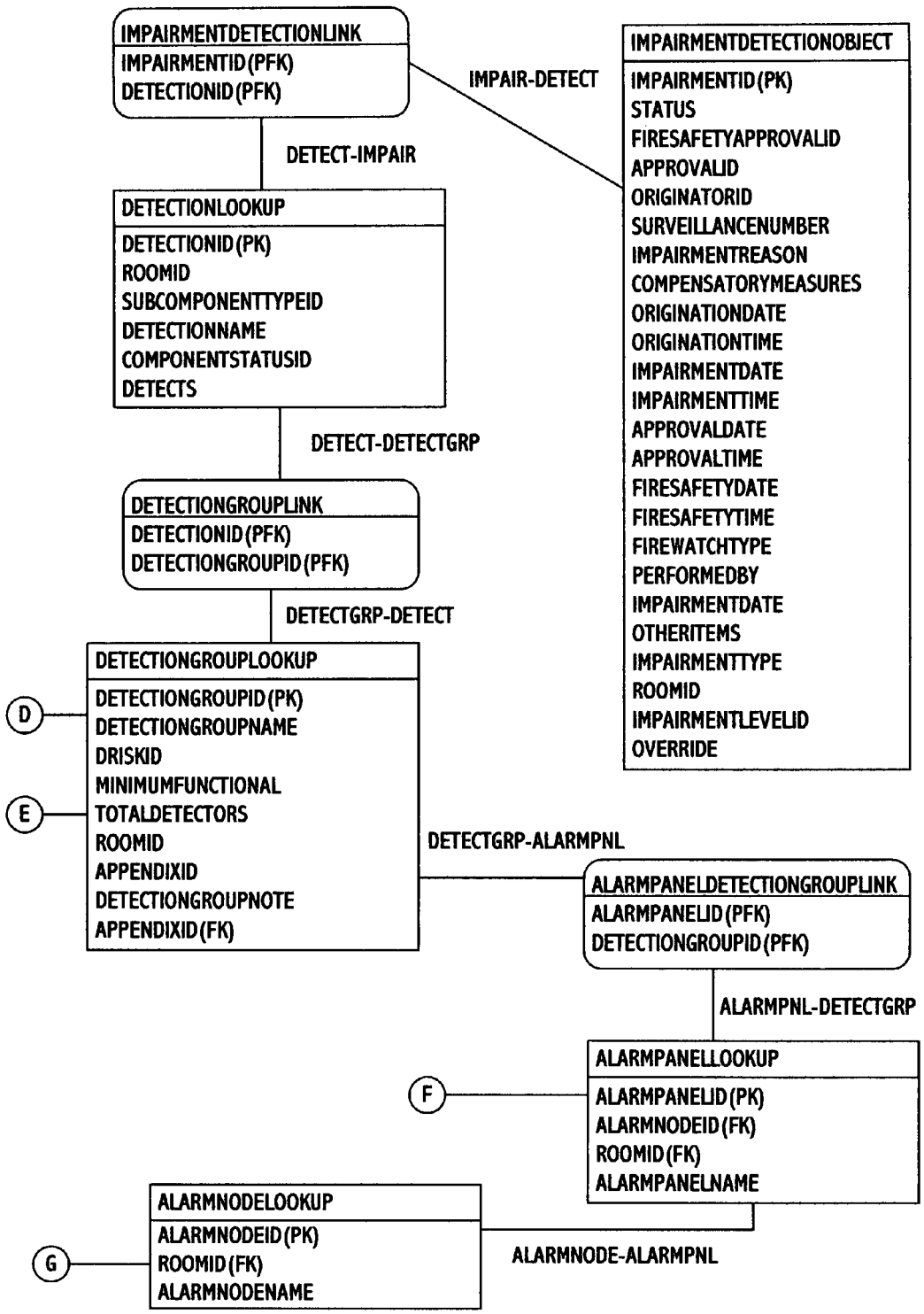
Figure 7D:
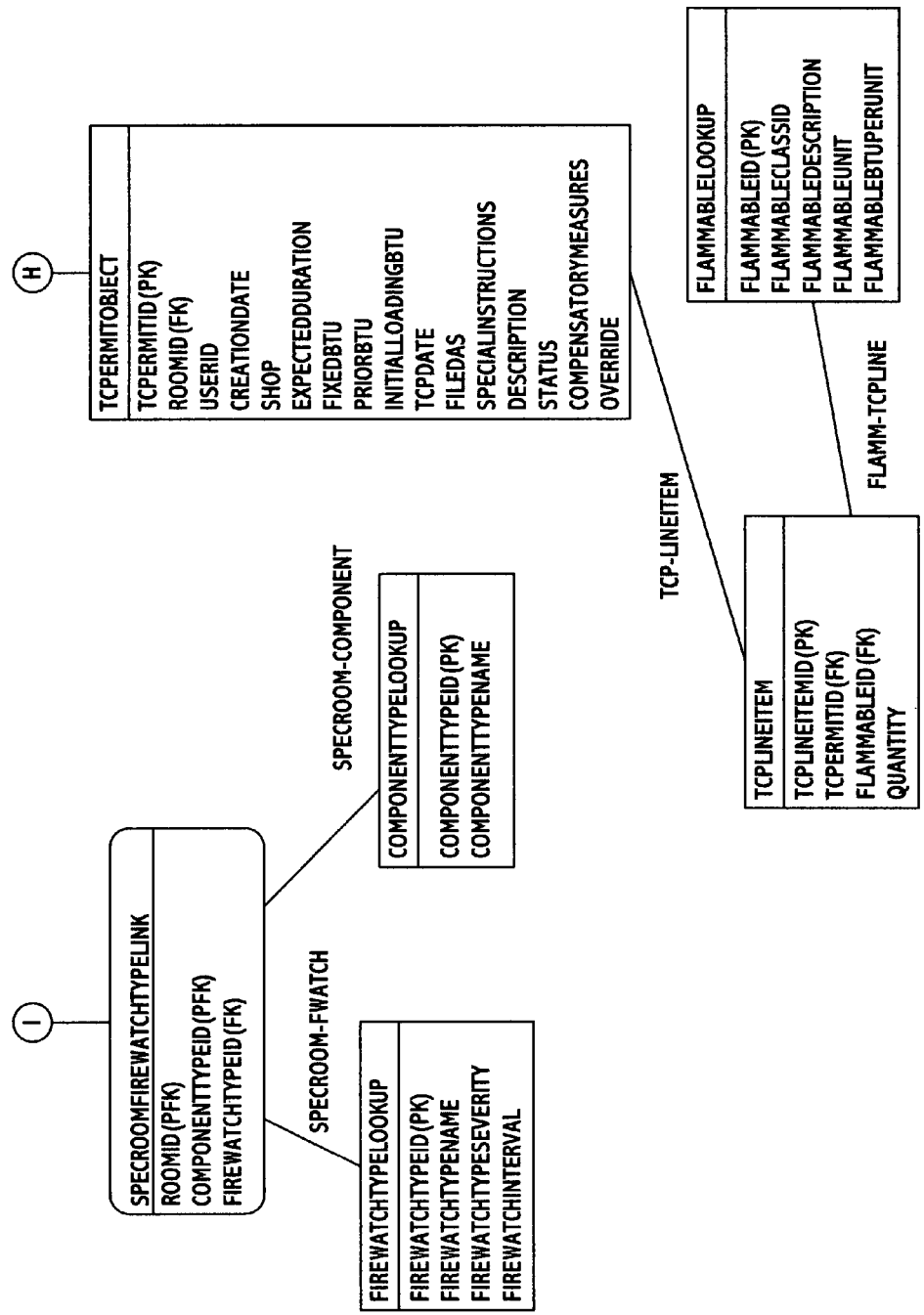
Figure 7E:
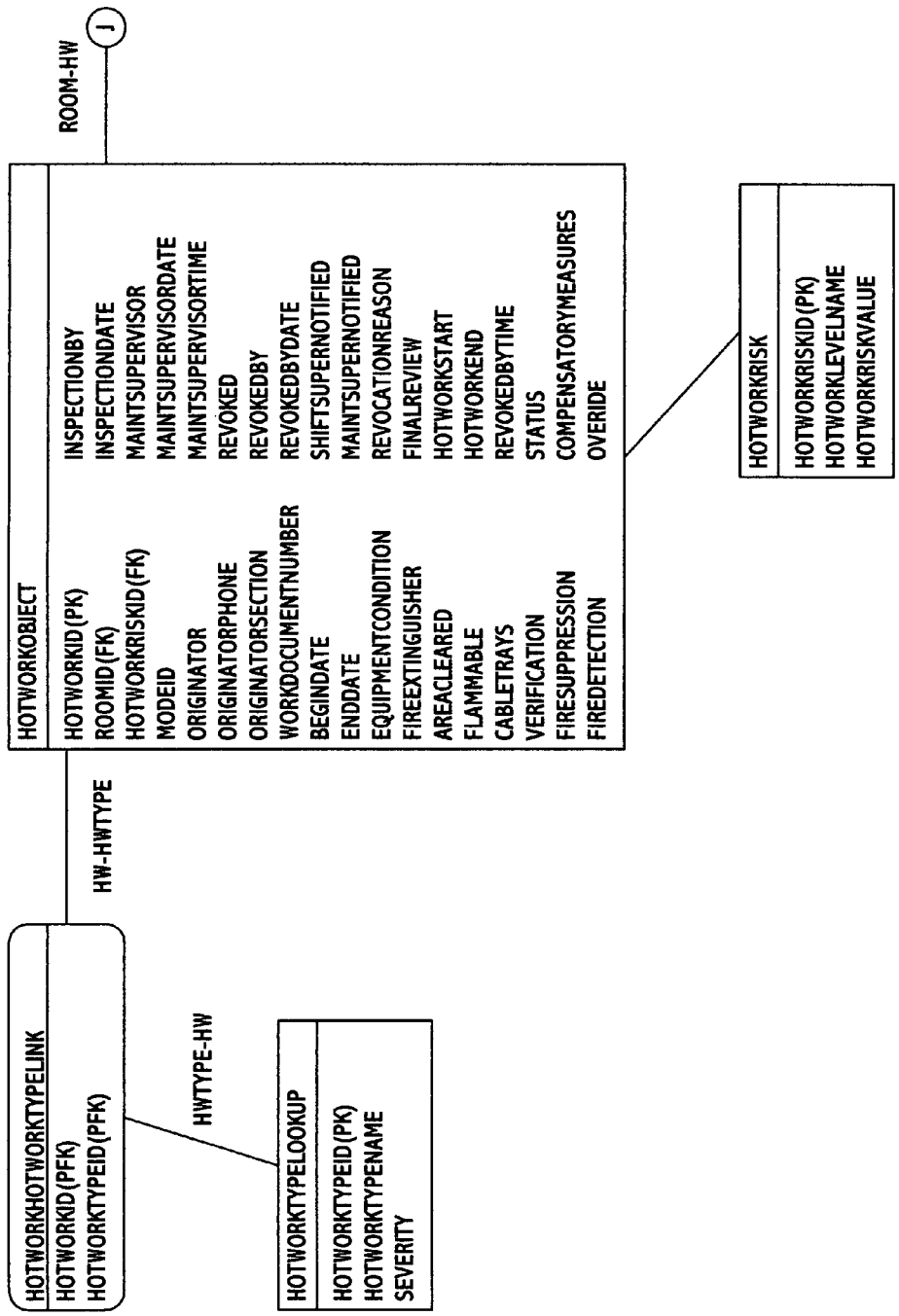

Referring to FIG. 6, when requesting a permit for hot work (e.g., welding), the following steps may be performed. First, information indicative of the hot work to be performed is entered into the system. (Block 61). A permit is then electronically generated and entered into the system for performing the work. (Block 62).

Once the work permit has been submitted, compensatory measures for safeguarding the hot work are calculated. These measures may require the duration of the hot work to be limited depending, for example, on the overall fire safety mode of the plant that exists at that time. (Block 63). The work area is inspected and status information is entered into the system. (Block 64). Additional compensatory measures are then calculated, if required. (Block 65).

Next, an assessment is performed to determine the level of risk imposed by the work, taking the compensatory measures into consideration (Block 66). If the assessment indicates that the hot work would leave the plant in a yellow or red risk status, the system may require a special approval of the work permit. (Block 67). Approval of this type may be given electronically, for example, by the fire marshal entering his userID and password into the system and then making an appropriate designation. The fire safety status of the plant is then updated and the work is performed. (Block 68).

Once the work has been completed, the permit entry for the hot work impairment is closed out in the system. The central processing unit, then, modifies the fire risk safety status of the plant, or work area, by re-calculating the risk score or color.

An exemplary application of the system and method of the present invention to assessing fire safety risk will now be given. This application uses Key System Tables that cover the basic structure of data centrally managed by the system and which are used to determine compensatory measures and risk. The tables store infrastructure information on rooms and fire safety systems in those rooms, as well as additional information relevant to rejecting or granting permits for plant work. These tables are preferably stored in database system 3 as shown in FIG. 1.

Fire Safety Tables and Relationship

This section describes the tables that contain key fire safety infrastructure information about the plant and the relationships between the infrastructure information. One important attribute of these data is the object's criticality in fire safety prevention. This criticality is captured and expressed in terms of "Appendix R, A, or O" of the fire safety regulations. Alternatively, "high, medium, or low" can be easily adopted for those plants that do not use the guidelines in the aforementioned fire safety-related appendices.

RoomObject.

The RoomObject table is used to store information about a room or fire zone. This may include the name of the room, the number of BTUs of combustible material allowed in the room under various circumstances (with or without suppression available, and two limits that can be used differently by the rules for the plant), the current risk value for the room, and any other administrative information about the room which needs to be tracked.

The RoomObject table is a central component in calculating compensatory measures and risk score. Infrastructure elements such as barriers and detectors are related to one or more rooms, and permitting processes for activities such as Hot Work or transient combustibles are related to one or more rooms.

BarrierLookup.

The BarrierLookup table contains a listing of all barriers (walls, doors, seals, etc.), including the name of the barrier, the sub-component type of the barrier (e.g. door, wall, structural steel), the criticality of this barrier for use by the rules (i.e. Appendix A, O, or R), and any administrative information about the barrier. The sub-component type helps to distinguish internal vs. external barriers since the rules use them differently.

BarrierRoomLink.

The BarrierRoomLink table links the barriers (from BarrierLookup) to the appropriate room or rooms (from RoomObject) each barrier protects.

SuppressionLookup.

The SuppressionLookup table contains a list of all suppression systems (sprinklers, fire hoses, etc.), including the name of the suppression, the subcomponent type of the suppression (e.g. sprinkler, fire hose), the criticality of this suppression for use by the rules (i.e. Appendix A, O, or R), and any administrative information about the suppression system.

SuppressionRoomLink.

The SuppressionRoomLink table links each suppression system to the room or rooms protected by that suppression system.

SuppressionBackupLookup.

The SuppressionBackupLookup table stores information about each suppression system and the suppression system(s) that acts as its backup, if any. The rules utilize the existence of a working backup suppression system in calculating Compensatory Measures and Risk score.

DetectionLookup.

The DetectionLookup table contains a list of all detectors (smoke detectors, temperature sensor, fire detectors, etc.), including the name of the detector, the subcomponent type of the detector (e.g. smoke detector), and any administrative information about the detection system.

DetectionGroupLookup.

The DetectionGroupLookup table tracks information about each group of detectors, including the criticality of the detection group for use by the rules (i.e. Appendix A, O, or R). A group of detectors will be used to protect a specific area of a plant, and there is information about each group that must be tracked. The most important datum for the calculation of the rules is the number of detectors that must be functioning in a particular group in order for the detectors to be considered as protecting that area. In many cases, one or two detectors can be down without impact to plant risk. The threshold for each detection group is contained within this table, and is used by the rules.

DetectionGroupLink.

The DetectionGroupLink table links the detectors to the detection group each one is in.

DetectionGroupRoomLink.

The DetectionGroupRoomLink table links the detection groups to the room or rooms each group protects.

AlarmPanelLookup and AlarmPanelDetectionGroupLink.

The AlarmPanelLookup table tracks the alarm panels in the plant, which in turn monitor various detection groups (via the AlarmPanelDetectionGroupLink table). When an alarm panel is impaired, all the detection groups associated with that panel are considered to be impaired.

AlarmNodeLookup.

The AlarmNodeLookup table tracks the alarm nodes, each of which controls one or more alarm panels. If an alarm node is impaired, then the associated alarm panels are considered to be impaired, which in turn causes all the associated detection groups to be considered impaired.

FireWatchTypeLookup.

The FireWatchTypeLookup table stores the different types of fire watches that a plant may decide to use as a Compensatory Measure. The rules link to this table using FireWatchTypeID. This allows a plant to easily customize and change the types of fire watches to be implemented by the plant. For example, one plant may decide to implement a 6 hour fire watch as opposed to an 8 hour fire watch that another plant may use. The types of fire watches are ranked in order of severity.

Storage of Impairment Information

If one of the fire safety mechanisms in the plant is not fully functional, then this is considered an impairment. For example, a malfunctioning smoke detector is considered a detector impairment. Information on impairments may be stored in three basic tables: ImpairmentBarrierObject, ImpairmentSuppressionObject, and ImpairmentDetectionObject. These tables store any information about the impairments that are desired to be tracked. Additionally, each impairment is related to one or more fire safety mechanisms in order to make rules-based calculations.

The ImpairmentSuppressionObject table includes a field that links the impairment to the appropriate suppression system in the SuppressionLookup table.

The ImpairmentDetectionLink table specifies all detectors affected by a detector impairment contained in the ImpairmentDetectionObject table.

The ImpairmentBarrierLink table specifies all the barriers affected by the impairment in the ImpairmentBarrierObject table.

The table structures for impairments and their related object are set up this way to allow a plant the flexibility to specify multiple impairments for a single mechanism, such as a barrier. This may be the case when a barrier needs to be removed on two distinct dates for two separate activities.

When a new impairment is entered into the system, the rules engine examines other impairments related to that room and other affected and surrounding rooms. It is able to do this because suppression systems, barriers, and detection groups are linked to one or more rooms (as explained earlier). The criticality for that mechanism (Appendix A, O, or R) is examined as part of calculating the compensatory measures and risk score based on the existence of this new impairment and other impairments.

Storage of Transient Combustible Permits (TCP)

Before a combustible material, such as gasoline, can be moved to certain locations in the plant, a Transient Combustible Permit (TCP) must be obtained that specifies each material and location for it. The overall goal for this is to reduce a buildup of materials in one area that may exceed a certain threshold for combustibility.

The TCPermitObject table is used as the primary table to store information about TCPs, including the start date and duration for the storage of the material. The details for the TCP is a list of combustible materials being tracked by the permit, which can be found in the TCPLineItem table. A record in the TCPLineItem table contains a link to the TCP number in the TCPermitID field, and a link to the actual combustible item in the FlammableID field. In addition, the quantity is tracked in the Quantity field. When the total number of BTUs of combustible material is needed, the software will multiply the quantity from the TCPLineItem table by the BTUs/unit value contained in the FlammableBTUPerUnit field of the FlammableLookup table and either display that value or pass it to the rules engine for further calculations.

The main TCPermitObject table contains basic information about the permit itself, including the affected room or fire zone in the RoomID field. The RoomID field in turn is a link to the RoomObject, where the information about the room is stored. This linkage is used by the software to look up the limit of BTUs of material allowed in the room, as well as to search for other TCPs already in the system. The rules engine will calculate and compare the total BTUs from the TCPs and compare this to the allowable limits. Impairments related to that room are used in the calculations. Based on these calculations, the application may advise that no more material should be allowed in the room, or that combustible material needs to be reduced immediately.

Storage of Hot Work Data

Hot Work encompasses any activity that may inadvertently or accidently ignite a fire. Examples of Hot Work include welding, cutting, and placement of a portable heater. The HotWorkObject table is the primary table used to track information about Hot Work being performed in one of the rooms of the plant. The information tracked includes the room (in the RoomID field which links to the RoomObject table), the type of Hot Work (from the HotWorkTypeLookup table via the HotWorkTypeID field in the HotWorkHotWorkTypeLink table, linked to by the HotWorkID field), and the HotWork-Start and HotWorkEnd fields, which list the dates and times when the Hot Work is scheduled to begin and end. The level of 'risk' for the Hot Work is contained in HotWorkRiskID and is used by the rules to calculate Compensatory Measures and Risk score.

Rules Execution Related Data

During the execution of the rules, both for calculation of Compensatory Measures and for the risk assessment calculations, the software implemented by the rules engine uses the tables listed above as well as the following set of tables used specifically for the calculations.

SpecRoomFireWatchTypeLink allows for certain rooms to have special rules about fire watches assigned in case of fire-safety component failures. This allows the application to capture 'exceptions to the rules' that may arise from specific human expertise and knowledge regarding the plant. Typically these exceptions are more stringent fire watches, and are stored and matched using the RoomID and the ComponentTypeID of the failure and then using the specified Fire WatchTypeID.

The ComponentTypeID is used to indicate whether the special rule is to be applied to a barrier impairment, detector impairment, or suppression system impairment. The application will incorporate and calculate an appropriate Compensatory Measures and Risk score based on the exceptions that have been entered into this table whenever an impairment of the indicated type is entered. An entity relationship diagram showing how all of the tables, data, and information stored in the system are interrelated is set forth in FIGS. 7A-7E.

Execution Analysis

The application performs a Rules Execution analysis using the rules-based decision engine. In the following description, examples are provided on how compensatory measures are calculated and risk assessments are performed to generate a risk score or color for a specific plant. These calculations and assessments are performed based on the data and information stored in the Key System Tables, as well as aggregate data from the various permitting processes to provide an integrated and comprehensive response.

More specifically, in the examples, Compensatory Measures and Risk score are calculated under various circumstances, such as an impairment, Hot Work, or TCP. The details below will show that information from the plant infrastructure and permit process are integrated in these calculations. However, the rules shown in the scenarios below are merely illustrative for a specific plant and are completely customizable. The numeric values also are only illustrative and can be customized to whatever numbers are appropriate for a specific plant.

Whenever an impairment is created, changed or closed, or a TCP or Hot Work permit is created, closed or changed, rules such as the ones below may be executed to determine the Compensatory Measures required, the updated Risk score, and the fire watches needed for each room.

It is also important to note that in alternative embodiments, the system and method of the present invention may allow the exact calculation of risk to be completely changed based on that plant's Prescriptive Risk Assessment (PRA) as well as other factors. The ability to support PRA based calculations represents a significant advance for these plants. This application can incorporate the results of a PRA by including the risk calculations in the rules engine.

Impaired Barrier

1. If a room has an impaired barrier,
    1.1. and the barrier is Appendix R,
        1.1.1. and the barrier is an internal one,
            1.1.1.1. and the room has working detection,
                then add 3.0 to the risk score and set an hourly fire watch on the room.
            1.1.1.2. and the room has NO working detection,
                then add 3.0 to the risk score and set a continuous fire watch on the room.
        1.1.2. and the barrier is not an internal one,
            1.1.2.1. and there is NO working detection on either side of the barrier, then add 3.0
                to the risk score and set a continuous fire watch on the room.
            1.1.2.2. and there is working detection on at least one side, then add 3.0 to the risk score and set an hourly fire watch on the room.
    1.2. and the barrier is Appendix A,
        then add 2.8 to the risk score and set an hourly fire watch on the room.
    1.3. and the barrier is Appendix O,
        then add 2.0 to the risk score and set an 8-hourly fire watch on the room.

Impaired Suppression System

2. If a room has an impaired suppression system,
    2.1. and the suppression system is Appendix R,
        2.1.1. and the suppression system has no backup,
            then add 3.2 to the risk score, set an hourly fire watch on the room, and issue a "plant shutdown in 24 hours" warning.
        2.1.2. and the suppression system has a backup,
            2.1.2.1. and the backup is impaired,
                then add 3.2 to the risk score, set an hourly fire watch on the room, and issue a "plant shutdown in 24 hours" warning.
            2.1.2.2. and the backup is not impaired,
                then add 3.2 to the risk score and set an hourly fire watch on the room.
    2.2. and the suppression system is Appendix A,
        2.2.1. and the room has a special fire watch rule,
            then add 3.0 to the risk score, and set the special fire watch on the room.
        2.2.2. and the room has no special fire watch rule,
            2.2.2.1. and the room has no working detection,
                then add 3.0 to the risk score, and set an hourly fire watch on the room.
            2.2.2.2. and the room has working detection,
                then add 3.0 to the risk score.
    2.3. and the suppression system is Appendix O,
        then add 2.8 to the risk score and set an 8-hourly fire watch on the room.

Impaired Detection Group

3. If a room has an impaired detection group or an alarm panel associated with that detection group is impaired,
    3.1. and the detection group is Appendix R,
        then add 2.5 to the risk score and set an hourly fire watch on the room.
    3.2. and the detection group is Appendix A,
        3.2.1. and the room has a special fire watch rule,
            then add 2.3 to the risk score and set the special fire watch on the room.
        3.2.2. and the room has no special fire watch rule,
            3.2.2.1. and the room has a working suppression system,
                then add 2.3 to the risk score.
            3.2.2.2. and the room has no working suppression system, then add 2.3 to the risk score and set an hourly fire watch on the room.
3.3. and the detection group is Appendix O,
then add 2.0 to the risk score and set an 8-hourly fire watch on the room.

Transient Combustible Permits

4. If a room has an impaired suppression system,
    4.1. and the total BTUs stored in the room (according to approved and active TCP's) exceeds the higher no-suppression limit for the room, then add 3.2 to the risk score and issue the "no more BTUs allowed in room" message.
    4.2. and the total BTUs stored in the room exceeds the lower no-suppression limit for the room,
        then add 0.8 to the risk score and issue the "reduce BTUs in room" message.
5. Otherwise
    5.1. if the total BTUs stored in the room exceeds the higher with-suppression limit for the room,
        then add 3.2 to the risk score and issue the "no more BTUs allowed in room" message.
    5.2. if the total BTUs stored in the room exceeds the lower with-suppression limit for the room,
        then add 0.8 to the risk score and issue the "reduce BTUs in room" message.

Hot Work

6. If a room has ongoing Hot Work,
    6.1. and the room has an impaired Appendix R, non-internal barrier with no working detection on either side,
        6.1.1. and the Hot Work is level 4,
            then add 2.3 to the risk score, set a continuous fire watch on the room, and issue a "suspend Hot Work immediately" message.
        6.1.2. and the Hot Work is level 3,
            then add 2.1 to the risk score, set a continuous fire watch on the room, and issue a "suspend Hot Work immediately" message.
        6.1.3. and the Hot Work is level 2,
            then add 1.8 to the risk score, set a continuous fire watch on the room, and issue a "suspend Hot Work immediately" message.
        6.1.4. and the Hot Work is level 1,
            then add 1.0 to the risk score, set a continuous fire watch on the room, and issue a "suspend Hot Work immediately" message.
    6.2. and the room has an impaired Appendix R internal barrier with no working detection in the room,
        6.2.1. and the Hot Work is level 4,
            then add 2.3 to the risk score, set a continuous fire watch on the room, and issue a "suspend Hot Work immediately" message.
        6.2.2. and the Hot Work is level 3,
            then add 2.1 to the risk score, set a continuous fire watch on the room, and issue a "suspend Hot Work immediately" message.
        6.2.3. and the Hot Work is level 2,
            then add 1.8 to the risk score, set a continuous fire watch on the room, and issue a "suspend Hot Work immediately" message.
        6.2.4. and the Hot Work is level 1,
            then add 1.0 to the risk score, set a continuous fire watch on the room, and issue a "suspend Hot Work immediately" message.
    6.3. and the room has any other sort of impairment other that the ones listed immediately above,
        6.3.1. and the Hot Work is level 4,
            then add 2.3 to the risk score and set a continuous fire watch on the room.
        6.3.2. and the Hot Work is level 3,
            then add 2.1 to the risk score and set a continuous fire watch on the room.
        6.3.3. and the Hot Work is level 2,
            then add 1.8 to the risk score and set a continuous fire watch on the room.
        6.3.4. and the Hot Work is level 1,
            then add 1.0 to the risk score and set a continuous fire watch on the room.
    6.4. and the room has no impairments,
        6.4.1. and the Hot Work is level 4,
            then add 2.3 to the risk score and set an 8-hourly fire watch on the room.
        6.4.2. and the Hot Work is level 3,
            then add 2.1 to the risk score and set an 8-hourly fire watch on the room.
        6.4.3. and the Hot Work is level 2,
            then add 1.8 to the risk score and set an 8-hourly fire watch on the room.
        6.4.4. and the Hot Work is level 1,
            then add 1.0 to the risk score and set an 8-hourly fire watch on the room.

Alarm Node Impairment

7. If the room contains an alarm node that is not the master alarm node,
    7.1. and the master alarm node is impaired,
        then set an hourly fire watch on the room.

Risk Assessment

Analyzing the risk of severe damage to the core of a nuclear power plant from various events may be referred to as the "core damage frequency." The core damage frequency may be used to affect design issues in the plant, and further may be relied on to ensure that each design feature is built with a design goal of having no more than a 1-in-a-million chance of causing core damage.

Each plant may periodically perform a 'Prescriptive Risk Assessment' (PRA) to come up with the core damage values. However, because of the complexity of the PRA calculations, they have not been implemented during operation of a nuclear plant to determine current risk in real time. That is, there has been a lot of work done to try to come up with a way to determine risk, but no satisfactory answer has come from this work, as each attempt, most notably research done by the Electric Power Research Institute, has focused on re-doing assessment calculations at the time of a significant event, which has turned out to be too complex to do or to comprehend.

The system and method of the present invention performs a risk assessment in a way that solves this problem. In accordance with one embodiment, the present invention performs risk assessment based on default calculation parameters or probabilistic risk assessment (PRA) values. Preferably, this assessment is performed based on the key tables and rules execution analysis previously described. However, in alternative embodiments, the use of these tables and the rules execution analysis is not a necessity.

Figure 8:
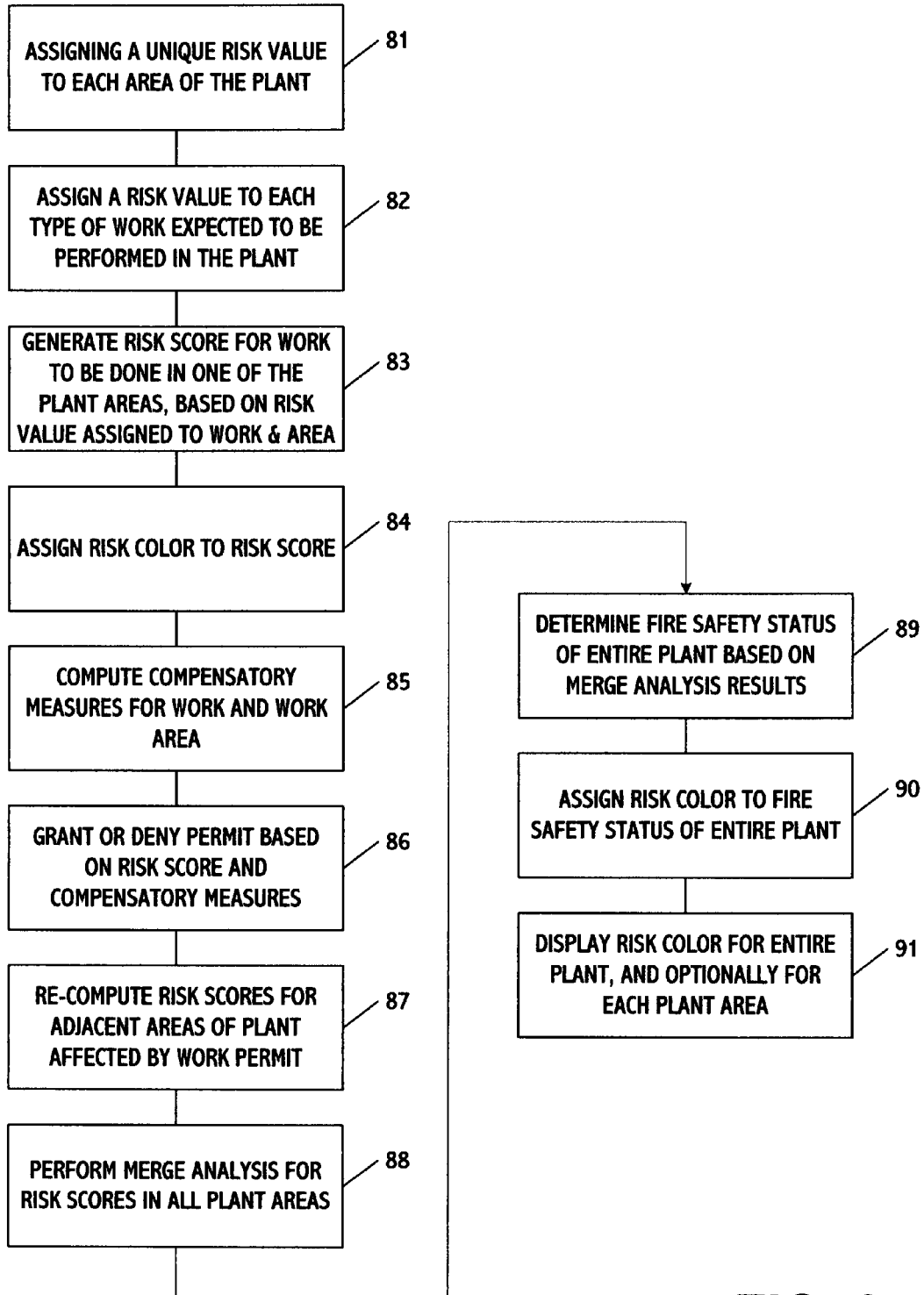
FIG. 8 is a diagram showing steps included in a method according to another embodiment of the present invention.

FIG. 8 shows steps included in a method for performing a risk assessment using default calculation parameters. The method includes generating a simplified risk model which involves assigning a unique risk value to each area of the plant. (Block 81). The risk value may lie within a predetermined range of values, e.g., between 0 and 10. The risk value may be decided arbitrarily by a system designer, preferably with consideration towards the risk associated with each different fire area in the plant.

Next, a risk value is assigned to each type of work expected to be performed in the plant. (Block 82). This work includes hot work, TCPs, or any other the other types of work previously mentioned. The risk values assigned to each work type may be decided arbitrarily by a system designer, with consideration towards the risk associated with each type of work.

After these values have been assigned and stored, for example, in the database memory in association with the key tables, a risk score is generated for specific work identified in a work permit request based on the area in which the work is to be performed. The risk score is generated based on the risk values assigned to the type of work and work area identified in the permit. (Block 83). The risk score may be generated, for example, by multiplying the risk values or according to another predetermined equation. The resulting product may then be normalized.

Once the risk score has been calculated, a risk color may be assigned to the risk score. (Block 84). The risk color (e.g., green, yellow, red) to be applied to risk scores between 0 and 10 may be determined beforehand by the system designer. The risk color is preferably displayed on a user terminal at this time.

Once the risk score and color have been calculated, compensatory measures for the work and work area are calculated, for example, based on the specific type of risk imposed and the work area(s) affected. (Block 85). The compensatory measures may be computed by a series of steps based on rules stored in the rules memory. For example, for a hot work permit, if the hot work involved corresponds to level 2 hot work (e.g., a specific type of hot work based on the degree to which the area will be exposed by flame), then if the risk score is at a certain level the rules memory may store rules indicating that a specific compensatory measure must be used. This calculation ensures a reduction in the risk associated with the hot work should the permit be authorized by the system.

In addition, the system software may identify all adjacent rooms and then determine, for example, if the barrier between the rooms is in tact, if the sprinklers and detection systems are working on both sides of the barrier, etc. Taking these additional factors into consideration, the system calculates one or more appropriate compensatory measures.

Once the compensatory measures have been calculated, the rules-based decision engine determines whether to authorize the work permit, for example, based on whether the risk is minor, moderate, or serious. (Block 86). At this time, the risk scores for all areas adjacent to or affected by the area in which the work described in the permit is to be performed may be re-calculated. (Block 87).

A merge operation is then performed which involves analyzing the risk score in all plant areas. (Block 88). The fire safety status of the entire plant may then be determined based on the results of the merge operation. (Block 89). The merge operation may involve, for example, determining which plant area has the highest risk score and then correlating the overall fire safety of the plant to that highest score. A risk color is then assigned to the risk score to indicate the fire safety status of the plant (Block 90), and the risk color is then displayed on a user terminal (Block 91).

As an example of this method, a plant can choose as an initial implementation of the algorithm to treat each room the same and to not use PRA values. Each room would have a risk value of 1. Then the values for Suppression Failure, Detection Failure, Barrier Failure, TCP in excess of the limit, and Hot Work ongoing in the room would each be assigned values. A plant could decide for example that a Barrier Impairment in their case would have a risk value of 2 and that Detection Failure would have a risk value of 1.5. Then a Barrier Failure and a Detection Failure in the same room would incur a total Risk Score of 3.5.

Further, the NRC established risk colors are then applied to the 0 to 10 scale. For the previous example, 'Green' could be assigned to risk scores of less than 1. 'White' could be assigned to risk scores of 1 to 3. 'Yellow' could be assigned to risk scores of 3-6. 'Red' could be assigned to risk scores of more than 6. This would mean that the previous example would create a risk color for this room of Yellow. The risk scores of each fire area in the plant are then analyzed, and the plant risk is equal to the highest risk score of any room in the plant. This risk score and/or color are presented to users of the software to display a calculation of the risk of the plant in real time.

Figure 9:
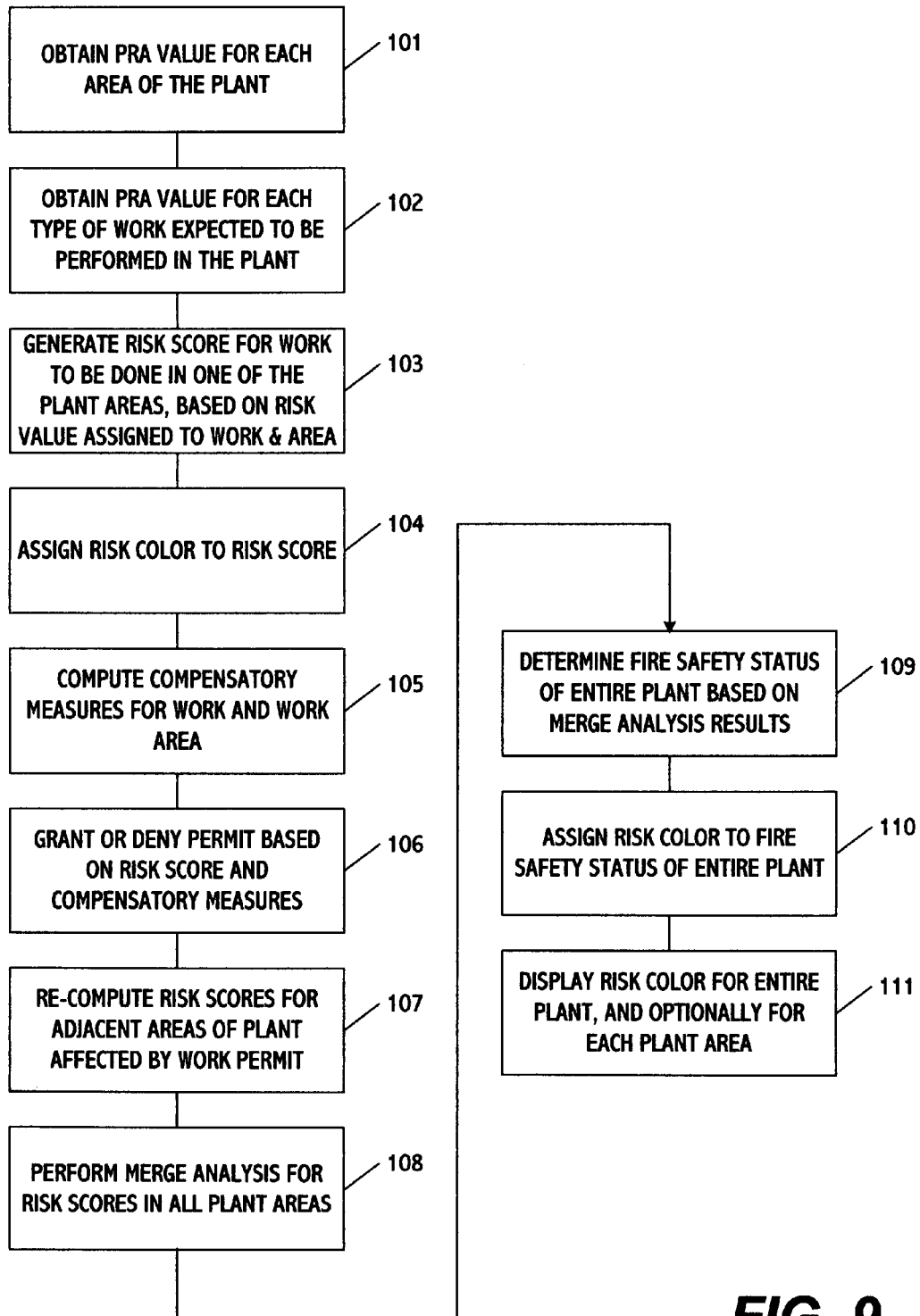
FIG. 9 is a diagram showing steps included in a method according to another embodiment of the present invention.

FIG. 9 shows steps included in a method for performing a risk assessment using PRA values. The initial two steps of this method involve obtaining PRA values for each area of the plant and each type of work expected to be performed in the plant. (Blocks 101 and 102). The remaining steps of the method (Blocks 103 to 111) may be analogous to those performed in Blocks 83 to 91 in FIG. 8, except that the risk score is computed based on the PRA values instead of default calculation parameters. The PRA values may be computed based on, for example, on statistical and historical information compiled by a government agency such as the NRC. In some applications, the use of PRA values instead of default values may yield a more accurate interpretation of the potential risk imposed by a permit and fire safety status of the plant.

In the foregoing embodiment, the PRA numbers calculated for each fire area and each fire related event may be normalized to produce risk values for each fire area associated with the probability of an event in that room causing a core damage event. Each fire safety related event may then be given a fixed value associated with the change in likelihood that that event would cause to the core damage frequency. The calculation of the exact risk values may be performed externally and preferably once during an analysis phase. The software of the system then uses these values as described above to calculate in real time the probability of a core damage event and convert that number to a risk color to present to software users.

By simplifying the calculations of the risk scores and providing a way to do this in real time, in a format that all end users not just senior physicists can understand, the software allows for better decision making by plant operations personnel. If this analysis were performed manually, mistakes would frequently be made as plant personnel would not fully comprehend the impact of a given action on risk to the whole plant.

More specifically, frequently an event can impact large sections of a plant, and a human reviewer for requests to do maintenance or repairs may not realize all fire areas that are impacted. For example, a given sprinkler system may serve 6 or 7 different fire areas. In turn, risk is affected by each adjoining fire area when the sprinkler system is taken out of service. These adjoining fire areas may be above, below or to the side of the fire areas served by the sprinkler system being taken out of service. In turn, there may be other work going on in those fire areas, such as Hot Work, which was started based on the assumption that the given sprinkler system would limit the risk of fire spreading to nearby areas.

Through the embodiments of the present invention described herein, the software-based decision process may identify significant risks that human reviewers would not catch or otherwise appreciate. The invention, therefore, will allow operations personnel to be more aware of the ramifications of approving work.

Also, for simpler situations where no other work is going on in affected areas, the computer software can be delegated the ability to approve low risk work, saving costs for the plants. Also, currently fire watches are expensive to perform because they require experienced, trained personnel to observe all areas on designated fire watch routes. Because the fire watch evaluation is done by humans who may have incomplete information, the procedure for determining what type of fire may be required is intentionally extremely conservative. By having one computer system be aware of all fire safety related work in the entire plant, as well as being aware of all associated risk impacts, plants will be able to reduce the fire watch requirements, without increasing fire safety risk, allowing the plants to save money.

According to one embodiment, the scores generated in accordance with the foregoing embodiments may be combined with score increments indicated in the rules execution analysis section to derive a final risk score and preferably a corresponding risk color. For example, the risk score for a certain work requested in a permit may be given an initial value (e.g., 0) and a score according to the rules execution analysis previously discussed may then be added based on various factors relating to the work, work environment, and/or work to be performed in adjacent areas of the plant, e.g, if a room has an impaired barrier, and the barrier is Appendix R, the barrier is an internal one, and the room has working detection, then add 3.0 to the risk score and set an hourly fire watch on the room.

The values (e.g, 3.0) in the rules execution analysis may correspond to default parameter values. Alternatively, the risk score value may constitute a probabilistic assessment value generated, for example, based on statistical analyses.

Once the risk score has been calculated, the score may be multiplied by a multiplication factor. This factor is preferably a numerical value selected to indicate an level of importance and/or severity of risk of the work to be performed and/or the place where the work is to be performed, as well as other factors. For example, the multiplication factor may be one value when a sprinkler head is to be replaced, but a much higher factor when hot work is to be performed. The numerical values may be arbitrarily assigned or generated on a statistical basis. According to this embodiment, the final risk score for work may be generated according to the following equation: risk score×multiplication factor=final risk score.

Comparison to a Manual Process

In approving hot work according to a manual process, a separate permit approval process may be required for any work involving significant heat or flames, including such things as welding, or the use of a large heater. This permit would be required not only for the hot work itself, but also for the transient combustibles that must be used to produce the heat.

In many plants, a welder must go from a building where the welder is based and receives his original work order, to an engineering building where he must calculate the amount of combustible material to be used and convert that to a btu calculation. Then, he must have an engineer or fire marshall check his calculation, check that the number of btus would be acceptable for fire area where the work is to be done, then approve the TCP permit. Then, the welder would go to a third building or office where a supervisor in the operations department would approve the Hot Work and advise the welder of precautions required for that particular welding in that particular room. Then, potentially, the welder might also have to visit the control room of the plant to get approval to proceed.

The system and method of the present invention simplifies this process. In accordance with at least one embodiment, the welder in this case could use a computer terminal in his office to enter the Transient Combustible Permit. The software would automatically calculate the btu's for the welder, eliminating the need for human review of the calculation, and make the determination of whether the amount requested exceeded the limit. A permit could then be provided by the software as a result of the calculations if the number of btus was below some threshold established and entered into the software during setup. The software also allows for the establishment of the a second, lower limit of btus for each room, which allows a plant to set one limit of btus that the software can automatically allow, and a higher level which shows the plants regulatory basis, which should not be exceeded in any case. This allows low risk applications to be approved, but when the btus in a fire area get close to the limit, a fire marshall approval could be required.

Once the welder gets the TCP from the software, the welder would then enter their Hot Work permit, which would give them permission to perform the welding itself. Again, the software would calculate risk based on anything else going on within that fire area and adjacent fire areas, then determine risk based on those calculation and determinations. Based on the end risk value, and compensatory measures procedures built into the rules engine, the software would first determine if the work was allowed (based on the risk value), then would determine the compensatory measures required by the work (based on the procedures information built into the rules).

If approved, the software would issue the actual Hot Work Permit, to be displayed at the work site, which would contain the compensatory measures required for the work. These compensatory measures would include fire watches required, precautionary measures required for the specific type of welding to be done, as well any other things required to maintain proper fire safety in all affected areas. Then, the welder would only be required to notify the control of work to be done, and would be able to skip visits to the engineer for TCP calculations, and the operations department for Hot Work approval. In addition, the assessment of risk caused by the proposed work would be done more holistically than could be done by a human reviewer, reducing the potential for incorrect approval of the work.

The following is a description of screens shots that may be generated by the system and method of the present invention using sample data.

Figure 10:
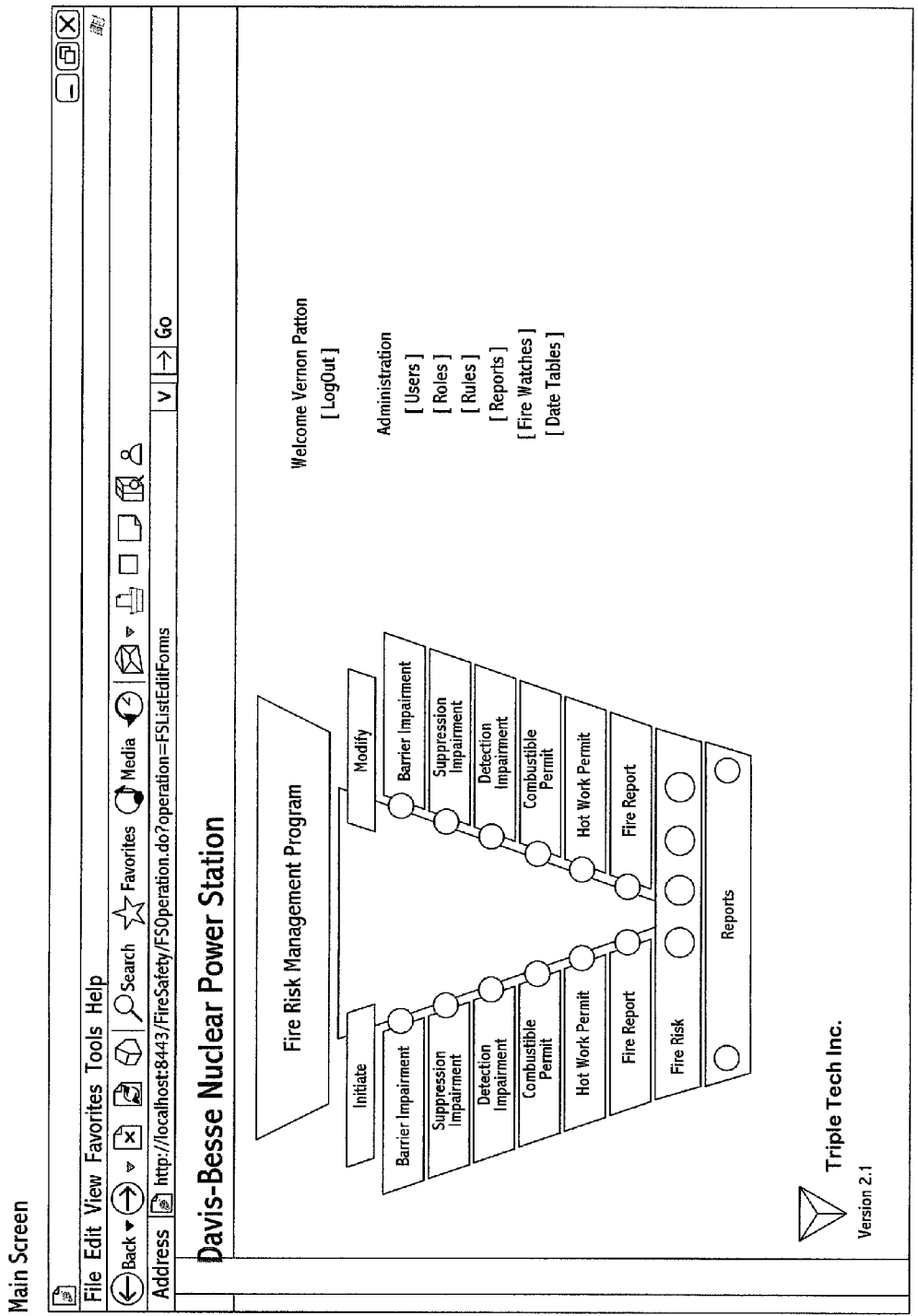
FIG. 10 is a diagram showing a main screen that may be generated by the system and method of the present invention for managing operations in a nuclear power plant.

FIG. 10 shows a main screen that may be generated by the system. The main screen includes a menu of selectable options that correspond to various functions of the system previously discussed. These options include Barrier Impairment for allowing a user to enter barrier impairment information into the system database, Suppression Impairment for allowing a user to enter suppression system impairment information into the database, and Detection Impairment for allowing a user to enter detection system impairment information.

The main menu may also include a Combustible Permit option for automatically generating a TCP based on information entered by a user, and a Hot Work permit option for automatically generating a corresponding Hot Work permit based on information entered by a user. Additional options may be included for generating fire and other types of reports. The aforementioned options may be provided in two context, Initiate and Modify.

The main screen also preferably includes a risk score indicative of the current overall fire safety status of the plant. This risk score is preferably color coded (Red—high risk status, Yellow—moderate risk status, Green—low risk status). In alternative embodiments, the risk score may be indicated numerically or in other ways.

Figure 11:
FIG. 11 is a diagram showing a screen containing barrier impairment information that may be generated by the system and method of the present invention for managing operations in a nuclear power plant.

FIG. 11 shows a screen containing barrier impairment information. In this screen, a list of barrier impairments in existence over a predetermined time frame are listed, along with information indicative of the status of each impairment, the date the impairment was entered into the system or last acted on, and the room in the plant facility in which the impairment exists.

FIG. 12 shows a screen that is generated when one of the barrier impairments listed on the screen of FIG. 11 is selected.

In FIG. 12, the example is shown where a barrier impairment in the form of a wall exists in Room 11 of the plant. This screen further provides component, work document number, and impairment risk level information associated with the Room 11 impairment, and a risk score (2.0) associated with the work to be done in correcting the impairment.

The screen also shows the types of Compensatory Measures that are recommended to be employed during correction of the Risk Level 2.0 impairment, which in this case is an 8 hour fire watch pursuant to an Appendix O barrier failure. The screen shows a similar Risk Score and Compensatory Measure for a barrier impairment in room 15. The screen may also includes a comments window for recording specific details of the barrier impairment, a window indicating the person(s) to perform the Compensatory Measure, as well as other information.

Additionally, the screen of FIG. 12 includes information identifying any fire suppression or detection systems that may be associated with the barrier or the room in which the barrier is located, information on whether any TCPs or Hot Work permits have been issued for this area of the plant. The status of these suppression and detection systems and the permits may also be indicated on this screen. An additional option (Get Compensatory Measures) is provided to allow a user to obtain additional Compensatory Measures calculated by the system software.

Figure 13:
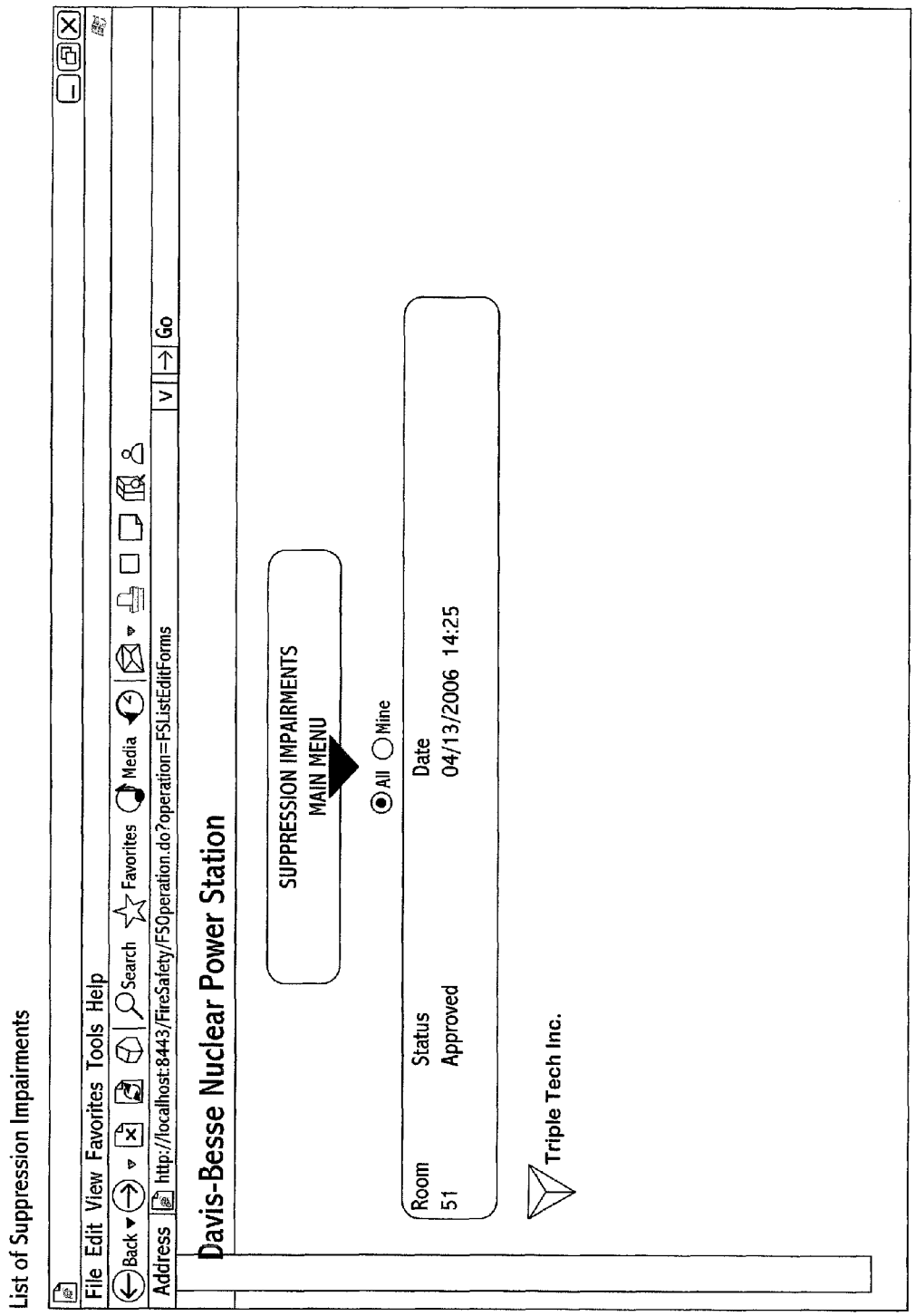
FIG. 13 is a diagram showing a screen containing suppression impairment information that may be generated by the system and method of the present invention for managing operations in a nuclear power plant.

FIG. 13 shows a screen containing suppression impairment information. In this screen, a list of suppression impairments in existence over a predetermined time frame are listed, along with information indicative of the status of each impairment, the date the impairment was entered into the system or last acted on, and the room in the plant facility in which the impairment exists.

FIG. 13 shows a screen that is generated when one of the suppression impairments listed on the screen of FIG. 11 is selected. In FIG. 14, the example is shown where a suppression impairment in Room 51 of the plant exists. This screen further provides component, work document number, and impairment risk level information associated with the Room 51 impairment, and a risk score (2.8) associated with the work to be done in correcting the impairment.

The screen also shows the type of Compensatory Measures that are recommended to be employed during correction of the Risk Level 2.8 impairment, which in this case is an 8 hour fire watch pursuant to an Appendix O barrier failure. The screen may also includes a comments window for recording specific details of the impairment (e.g., test), a window indicating the person(s) to perform the Compensatory Measure, as well as other information.

Additionally, the screen of FIG. 14 includes information identifying any barrier or detection systems that may be included in the room in which the suppression system is located, information on whether any TCPs or Hot Work permits have been issued for this area of the plant. The status of these suppression and detection systems and the permits may also be indicated on this screen. An additional option (Get Compensatory Measures) is provided to allow a user to obtain additional Compensatory Measures calculated by the system software.

Figure 15:
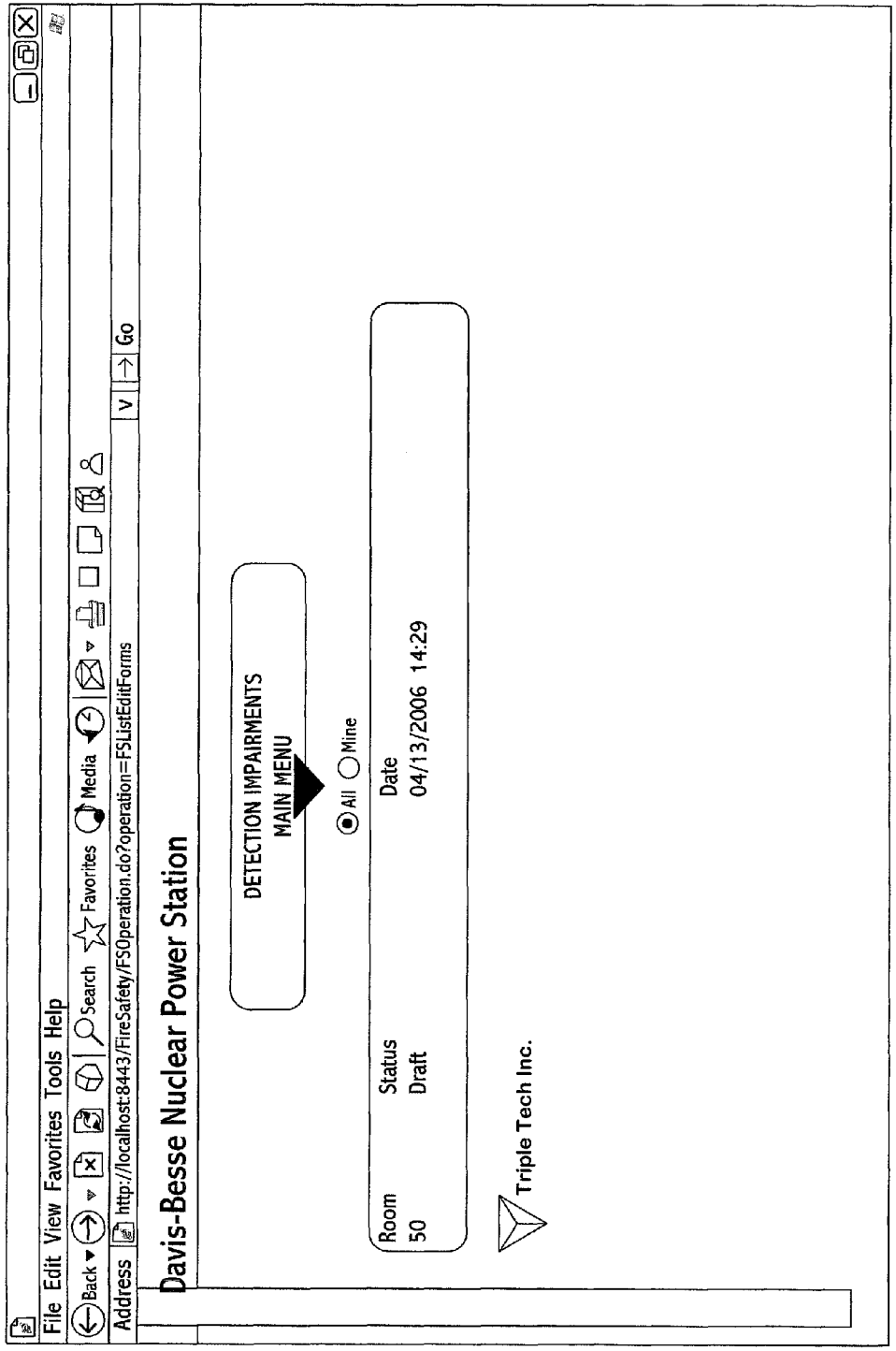
FIG. 15 is a diagram showing a screen containing detection impairment information that may be generated by the system and method of the present invention for managing operations in a nuclear power plant.

FIG. 15 shows a screen containing detection impairment information. In this screen, a list of detection impairments in existence over a predetermined time frame are listed, along with information indicative of the status of each impairment, the date the impairment was entered into the system or last acted on, and the room in the plant facility in which the impairment exists.

FIG. 16 shows a screen that is generated when one of the detection impairments listed on the screen of FIG. 15 is selected, or when it is desired to view all of the detection impairments in the plant. In FIG. 16, the example is shown where a detection impairment in Room 50 of the plant exists. This screen further provides work document number and impairment risk level information associated with the Room 50 impairment, and a risk score (3.0) associated with the work to be done in correcting the impairment.

The screen also shows the type of Compensatory Measures that are recommended to be employed during correction of the Risk Level 3.0 impairment, which in this case is a continuous fire watch associated with an Appendix R barrier. The screen may also includes a comments window for recording specific details of the impairment (e.g., test). Additionally, the screen lists detection impairments that may exist in other rooms of the plant, the Risk score associated with each impairment, and the Compensatory Measure(s) used to safeguard work to be performed in correcting the impairment.

Figure 17:
FIG. 17 is a diagram showing a screen that may be generated in order to obtain authorization for a Transient Combustible permit for moving flammable materials in the power plant.

FIG. 17 shows a screen that is generated in order to obtain authorization for a Transient Combustible permit for moving flammable materials in Room 30 of the plant. The screen includes shop and work document number information associated with the permit, as well as the expected duration the permit is to be in place.

The screen also provides information describing the TC material to be moved and recommended loading techniques. In this portion of the screen, a window is provided to allow a user to designate the type of transient combustible material (e.g., wood, alcohol, acetylene) and its associated BTU rating, the amount of material to be moved, and the number of BTUs associated with that amount of material. The screen then shows a Risk score calculated by the rules engine, for example, in accordance with the Rules Execution section previously discussed, and the Compensatory Measure(s) that may be required, if any, in moving the material.

Additionally, the screen may include information identifying any barrier, suppression, or detection systems that may be included in the room (e.g, Room 30) in which the combustible material is located, information on whether any TCPs or Hot Work permits have been issued for this area of the plant.

Figure 18:
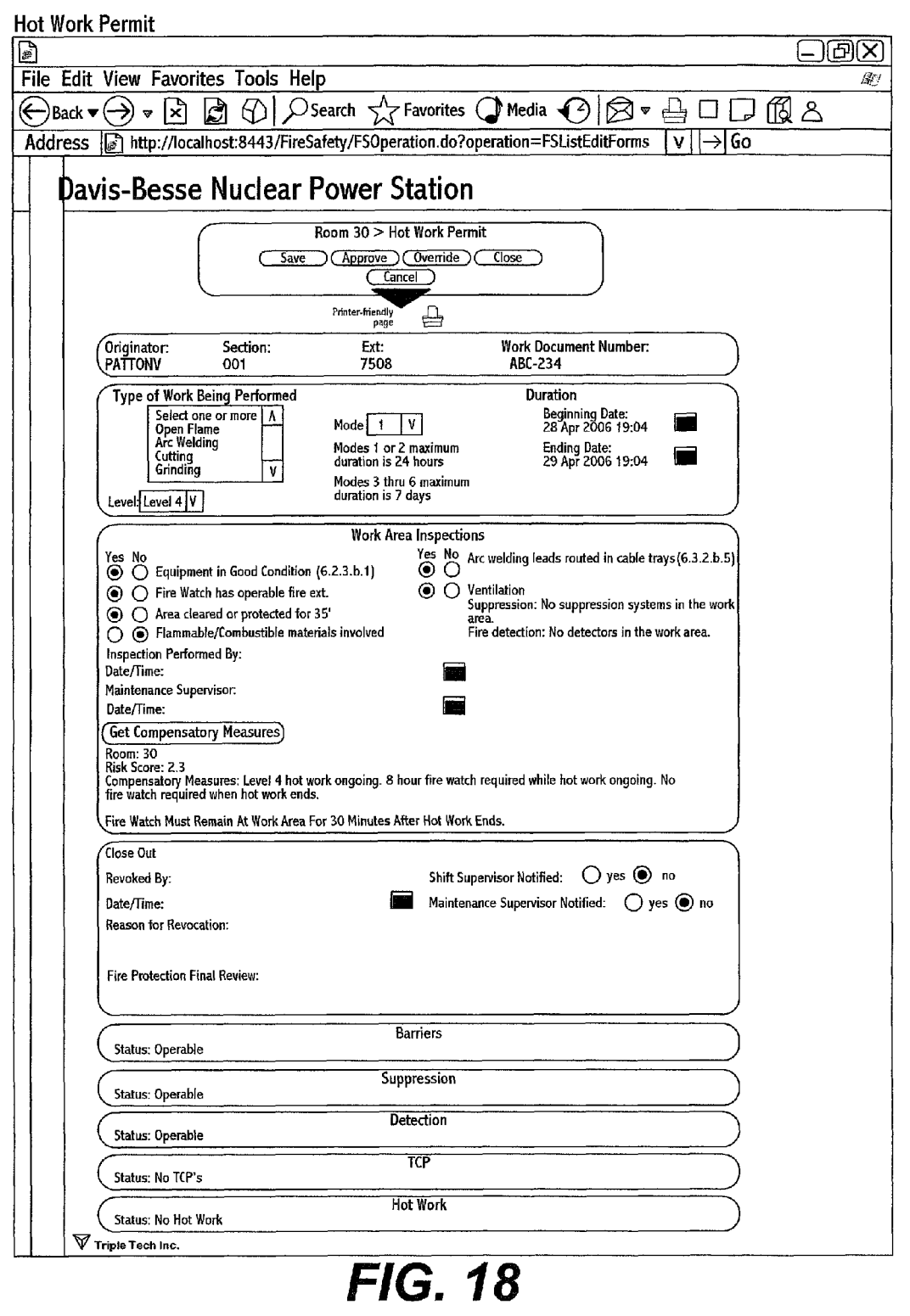

FIG. 18 shows a screen that is generated to obtain a Hot Work permit. This screen identifies the room (Room 30) in which the hot work is to be performed, the type of hot work (e.g., open flame, arc welding, cutting, grinding) to be performed, and the time duration for completing the work. The screen also includes information indicating data obtained from an inspection of the work area. This data includes the condition of the equipment to be used in performing the hot work, whether the work area has fire suppression and detection systems, and whether the work area includes flammable or combustible materials as well as other information.

The screen also shows the Risk score (2.3) computed by the rules engine for the hot work to be performed, and well as any Compensatory Measures that are to be implemented during and after the work is completed. The screen also includes a Close Out window, which is to be filled in once the work is performed.

In accordance with one embodiment, each of the versions of the permit may be generated and governed by different ones of the foregoing screens. For example, create Barrier Impairment may create the barrier impairment form. This form may not directly be the work permit, but may be considered a pre-requisite to performing the work. The Create Hot Work permit screen may correspond to an actual work permit. The Create TCP screen allows the user to create a Transient Combustible Permit, which is a pre-requisite for carrying flammable materials into an area, but does not constitute the work permit for the associated work.

Additional System Features

The system and method may include the following additional features.

Reporting a Fire.

When a fire breaks out in the plant, information about the fire, suppression systems and detectors are entered into the system database. The information may be entered in real-time through the interface module and appropriate action may be automatically taken by the central processing unit. This action may include providing notification to fire-fighting authorities, automatic activation of the fire suppression systems in various areas throughout the plant, etc. A historical record of the fire and its causes and the extent of the resulting damage may then be stored in the database for future use in calculating new compensatory measures and/or for providing more accurate risk assessments when permits are submitted for future work. In one or more embodiments described herein, the work permits may be automatically and electronically generated by the system based on entered information concerning the work.

Monitoring Fire Risk.

In addition to monitoring the overall fire risk/safety status for the plant, the system and method of the present invention may monitor the fire safety status of various areas of the plant, e.g., on an area-by-area or even on a room-by-room basis within various buildings on the plant site. Users may then select different rooms or areas to obtain a real-time indication of the status of those rooms/areas, and to determine all associated impairments and permits that exist for those rooms/areas at any given time. Preferably, the system may generate a graphical representation of the plant layout colored coded to provide a visual indication of the status of each area/room of the plant. The fire safety status of each area may be used as a basis for generating the fire safety status of the overall plant.

Fire Safety Reports.

The system may also allow a user to select a specific type of report to be generated. These reports include ones indicative of barrier impairments, detection system impairments, and/or transient combustible permits (TCP) that exist throughout the plant. The reports may be generated based on search criteria entered by a user. The search criteria may include an effective start date and end date of work that was performed, status and report format.

Fire Watch Routes.

The system may also maintain and generate information on various fire watch routes that exist throughout the plant. The fire watch routes may be graphically depicted on a screen in selectable form. When a route is selected, the system may output fire safety information applicable to the route.

Fire Safety System Data.

The system may also create or update fire safety system data for the plant. This function may include adding or updating a user to the system and assigning certain rights and authorities to the user (e.g., the ability to approve permits for work that pose moderate or serious threat to safety), adding or updating roles to the system including assigning specific rights each role is to have, and selecting a data table or data item to edit or update. These function may be performed independently of one another if desired.

While the aforementioned embodiments have been described particularly with respect to managing the operations of a nuclear power plant, those skilled in the art can appreciate that the system and method of the present invention may also be applied to managing the operations of other plants or facilities, not only with respect to protecting against fire risks but also other hazards such as toxic or chemical spills, mechanical failures, electrical shock or arcing, and cracks or defects in plant infrastructure just to name a few.

The present invention may offer a number of advantages not currently available. For example, significant cost savings can be achieved by shortening the process for obtaining permission to do work, particularly for TCP and Hot Work permits, and for reducing the number and frequency of fire watches without increasing plant risk. This enables plants to more easily move from the current 'prescriptive' rules for fire safety to the new 'Risk Informed' regulations.

This transition may be considered by the NRC to not only improve safety, but also save plants a lot of money by only doing compensatory measures that actually provide significant reductions to the risk of the plant, and allow the plant to reduce redundant or unnecessary precautions. The present invention also provides a real time assessment of risk for plant operations. Currently, no such assessment is available despite many prior attempts to solve the problem. By displaying risk color directly to all software users on the main screen of the application, plant operations have a fast, simple way to be aware of the plant status.

The embodiments of the present invention described herein can be extended to provide the same risk determination for flood and radiation risk. These risk related activities are currently also conducted manually, and provide many of the same challenges as the fire safety risk determination. For example, when a penetration of a barrier is requested, different departments within a plant must determine the fire safety impact of a hole in a fire barrier, determine the potential for the penetration to create a flood risk (if the core overheats, it is flooded with water—you don't want that water to flood the entire plant; you also don't want normal sprinklers to flood adjacent rooms that may have important safety systems or human exit paths), and radiation risk if the wall is a radiation barrier. We should be able to claim generally that our method for holistic risk calculation includes risk calculation for radiation and flood risk determinations as well, and that the combination of any 2 within a single software application is also a new invention.

Any reference in this specification to an "embodiment" means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Furthermore, for ease of understanding, certain functional blocks may have been delineated as separate blocks; however, these separately delineated blocks should not necessarily be construed as being in the order in which they are discussed or otherwise presented herein. For example, some blocks may be able to be performed in an alternative ordering, simultaneously, etc.

Although the present invention has been described herein with reference to a number of illustrative embodiments, it should be understood that numerous other modifications and embodiments can be devised by those skilled in the art that will fall within the spirit and scope of the principles of this invention. More particularly, reasonable variations and modifications are possible in the component parts and/or arrangements of the subject combination arrangement within the scope of the foregoing disclosure, the drawings and the appended claims without departing from the spirit of the invention. In addition to variations and modifications in the component parts and/or arrangements, alternative uses will also be apparent to those skilled in the art.

We claim:

1. A computer implemented method of determining whether to approve a work permit in a nuclear power plant, comprising:
   receiving an electronic permit request for a permit to perform work in an area of the plant;
   determining a quantitative fire risk value associated with the work identified in the permit request;
   comparing the determined fire risk value to a predetermined quantitative threshold fire risk value associated with the area in which the work will be performed; and
   generating automatic electronic authorization for the permit if the determined fire risk value does not exceed the threshold fire risk value.

2. The method of claim 1, further comprising determining, with one or more processors, at least one compensatory measure to provide protection against a fire risk posed by the work identified in the permit request.

3. The method of claim 2, wherein the step of electronically determining at least one compensatory measure comprises electronically checking the status of fire suppression equipment in and adjacent to the area of the plant in which the work listed in the permit request will occur.

4. The method of claim 2, wherein the step of electronically determining at least one compensatory measure comprises electronically checking the status of combustible transit permits that have been issued for plant areas adjacent to the area of the plant in which the work listed in the permit request will occur.

5. The method of claim 2, wherein the step of electronically determining at least one compensatory measure comprises electronically checking the status of hot work permits that have been issued for plant areas adjacent to the area of the plant in which the work listed in the permit request will occur.

6. The method of claim 2, wherein the step of electronically determining at least one compensatory measure comprises electronically checking the status of barriers in areas of the plant in and adjacent to the area of the plant in which the work listed in the permit request will occur.

7. The method of claim 2, further comprising generating and maintaining a database that lists the physical relationships between barriers, fire detection equipment and fire suppression equipment for different areas of the plant, and wherein the step of electronically determining at least one compensatory measure comprises electronically checking the locations of barriers, fire detection equipment and fire suppression equipment in areas of the plant that are in and adjacent to the area in which the work listed in the permit request will occur.

8. The method of claim 7, wherein the step of generating and maintaining the database also comprises storing the current status of the barriers, fire detection equipment and fire suppression equipment, and wherein the step of electronically determining at least one compensatory measure comprises electronically checking the current status of barriers, fire detection equipment and fire suppression equipment located in areas of the plant that are in and adjacent to the area in which the work listed in the permit request will occur.

9. The method of claim 8, wherein the step of electronically determining at least one compensatory measure further comprises electronically checking the current status of combustible transit permits and hot work permits that have been issued for areas of the plant that are in and adjacent to the area in which the work listed in the permit request will occur.

10. The method of claim 1, wherein the step of determining the quantitative fire risk value associated with the work identified in the work permit comprises:
   determining a work risk value associated with the work identified in the permit request;
   determining if any compensatory measures will be taken to reduce the risk of fire posed by the work identified in the permit request;
   determining a compensatory value representing an amount by which the work risk will be reduced by any compensatory measures that will be taken; and
   determining the quantitative fire risk value associated with the work identified in the permit request based on the determined work risk value and the determined compensatory value.

11. The method of claim 1, wherein the step of determining the quantitative fire risk value associated with the work identified in the permit request comprises considering conditions in areas adjacent to the area in which the work identified in the permit request will be performed.

12. The method of claim 11, wherein considering conditions in the areas adjacent to the area in which the work will be performed comprises considering the condition of fire suppression equipment in areas adjacent to the area in which the work will be performed.

13. The method of claim 11, wherein considering conditions in the areas adjacent to the area in which the work will be performed comprises considering the condition of fire detection equipment in areas adjacent to the area in which the work will be performed.

14. The method of claim 11, wherein considering conditions in the areas adjacent to the area in which the work will be performed comprises considering the condition of fire barriers between the area in which the work will be performed and areas adjacent to the area in which the work will be performed.

15. The method of claim 11, wherein considering conditions in the areas adjacent to the area in which the work will be performed comprises considering any hot work that is scheduled to be performed in areas adjacent to the area in which the work will be performed.

16. The method of claim 11, wherein considering conditions in the areas adjacent to the area in which the work will be performed comprises considering whether any combustible materials are currently being stored in areas adjacent to the area in which the work will be performed.

17. The method of claim 1, wherein the step of determining the quantitative fire risk value associated with the work identified in the permit request comprises determining a fire risk value based on a work risk value associated with the work identified in the permit request and an area risk value associated with the area in which the work will be performed.

18. The method of claim 1, wherein the step of determining the quantitative fire risk value associated with the work identified in the work permit request comprises considering the risk of impairment of alarm panels located in the area where the work identified in the permit request will be performed.

19. The method of claim 18, wherein the step of determining the quantitative fire risk value associated with the work identified in the work permit request further comprises considering the risk of impairment of alarm panels located in areas surrounding the area where the work identified in the permit request will be performed.

20. The method of claim 1, wherein the step of determining the quantitative fire risk value associated with the work identified in the permit request comprises determining an overall fire risk value, and wherein determining the overall fire risk value comprises:

determining a work area risk value representative of the fire risk in the area where the work will be performed;

determining surrounding area risk values for areas adjacent to the area where the work will be performed, wherein each surrounding area risk value is representative of the fire risk in a surrounding area which is associated with performance of the work identified in the permit request; and determining the overall fire risk value based on the work area risk value and the surrounding area risk values.

21. A computer implemented method of determining whether to approve a work permit in a nuclear power plant, comprising:

receiving an electronic permit request for a permit to perform work in an area of the plant;

recommending that the permit request be approved if a quantitative fire risk value posed by the work identified in the permit request does not exceed a predetermined threshold fire risk value associated with the area in which the work will be performed; and recommending that the permit request be disapproved if a quantitative fire risk value posed by the work identified in the permit request exceeds the predetermined threshold fire risk value associated with the area in which the work will be performed.

22. The method of claim 21, wherein the step of recommending that the permit request be approved comprises:

determining a quantitative fire risk value associated with the work identified in the permit request;

comparing the determined fire risk value to the predetermined threshold fire risk value associated with the area in which the work will be performed; and recommending that the permit request be approved if the determined fire risk value does not exceed the threshold fire risk value.

23. The method of claim 22, wherein the step of determining the fire risk value associated with the work identified in the work permit comprises:

determining a quantitative work risk value associated with the work identified in the permit request;

determining whether any compensatory measures will be taken to reduce the risk posed by the work identified in the permit request;

determining a compensatory value representing an amount by which the quantitative work risk will be reduced by any compensatory measures that will be taken; and determining the quantitative fire risk value associated with the work identified in the permit request based on the determined work risk value and the determined compensatory value.

24. The method of claim 22, wherein the step of determining the fire risk value associated with the work identified in the permit request comprises determining a fire risk value based on a work risk value associated with the work identified in the permit request and an area risk value associated with the area in which the work will be performed.

25. The method of claim 2, wherein the step of electronically determining at least one compensatory measure comprises electronically checking the status of fire detection equipment in and adjacent to the area of the plant which the work listed in the permit request will occur.

\* \* \* \* \*